US006041232A

United States Patent [19]

Jennings, III

[11] Patent Number: 6,041,232

[45] Date of Patent: Mar. 21, 2000

[54] AGGREGATION OF SHAPED DIRECTIONAL RECEIVING ANTENNA ARRAY FOR IMPROVED LOCATION INFORMATION

[75] Inventor: Earle Willis Jennings, III, San Jose, Calif.

[73] Assignee: SC-Wireless Inc., San Jose, Calif.

[21] Appl. No.: 08/997,155

[22] Filed: Dec. 23, 1997

[51] Int. Cl.$^{7}$ .......................... H04Q 7/00; H04Q 21/00; H04B 1/40

[52] U.S. Cl. .......................... 455/422; 455/562; 343/844

[58] Field of Search .......................... 455/562, 422, 455/456, 101, 279.1, 506, 277.1, 277.2

[56] References Cited

U.S. PATENT DOCUMENTS

| | | | |
|---|---|---|---|
| 4,128,740 | 12/1978 | Graziano | 455/447 |
| 4,302,734 | 11/1981 | Stockton | 333/104 |
| 4,888,593 | 12/1989 | Friedmann | 342/387 |
| 5,491,833 | 2/1996 | Hamabe | 455/422 |
| 5,742,911 | 4/1998 | Dumbrill | 455/562 |

*Primary Examiner*—Paul Loomis
*Assistant Examiner*—Nick Corsaro
*Attorney, Agent, or Firm*—David E. Lovejoy

[57] ABSTRACT

A micro-diverse directional antenna array positioned proximately upon the boundary of a convex shape whereby the primary attenuation lobes of neighboring antennae overlap. This creates a situation in which the reception of signals by said array from the space-time-delay domain of transmission can be effectively modeled as a banded linear transformation upon discretized space-time-delay domain of transmission yielding the antenna reception at discrete time steps.

21 Claims, 19 Drawing Sheets

FIG. 9A
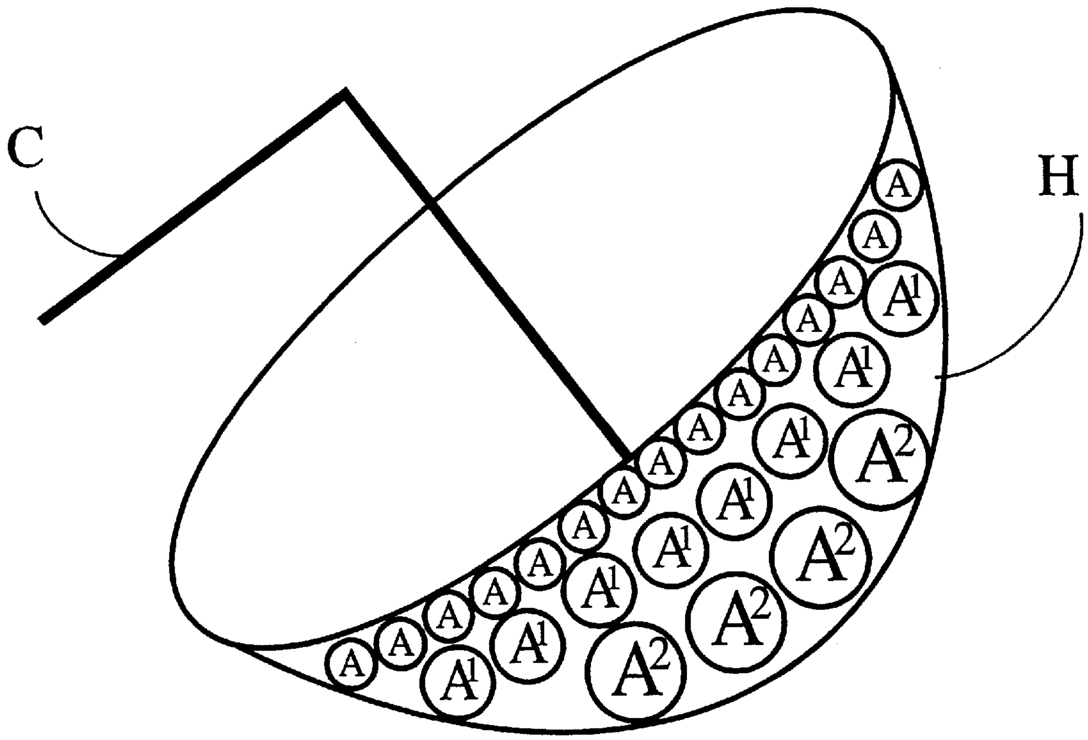
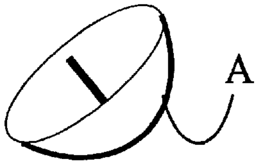
FIG. 9B
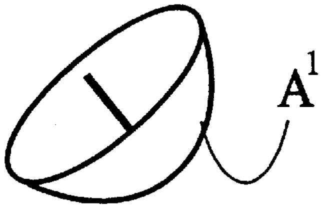
FIG. 9C
FIG. 9D
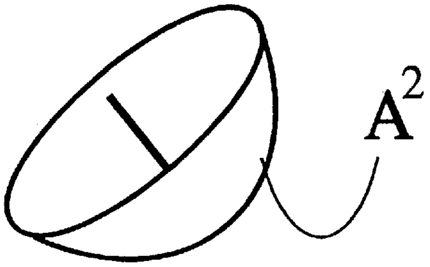

FIG. 10A
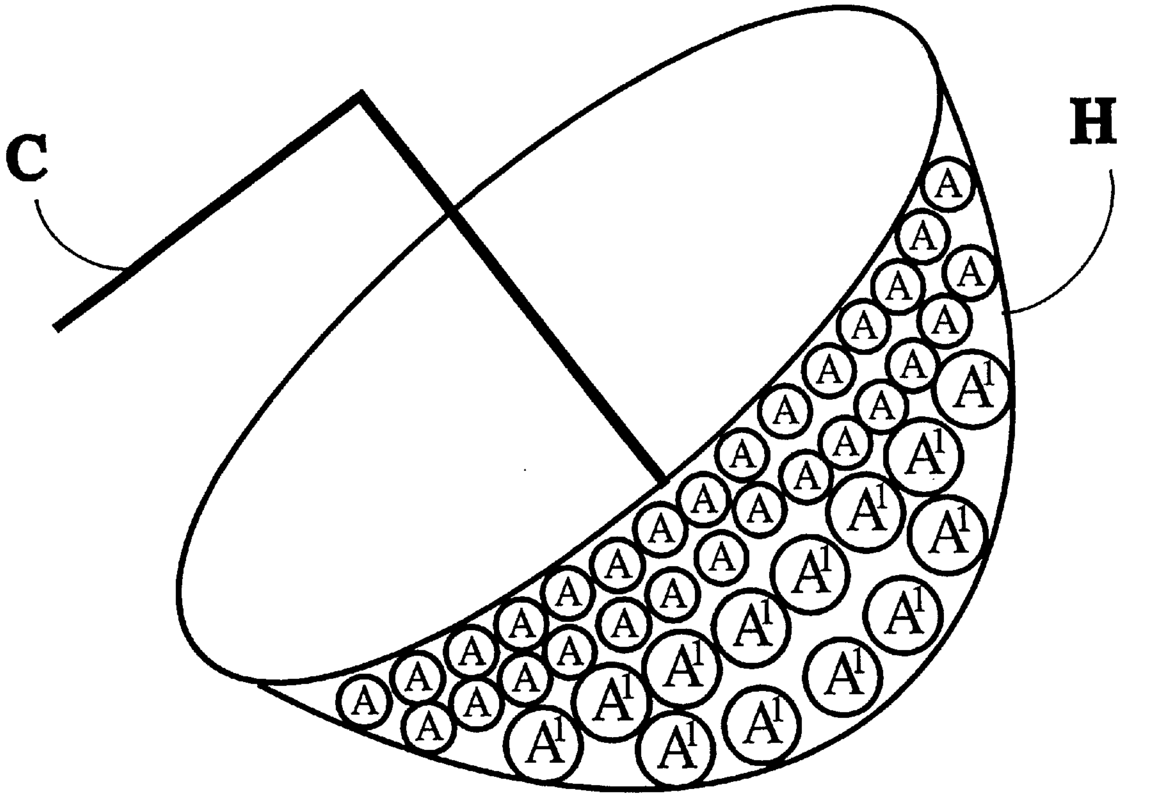
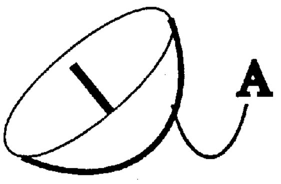
FIG. 10B
FIG. 10C
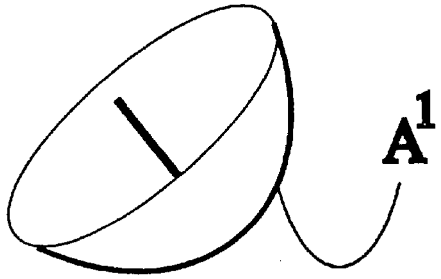

FIG. 11A
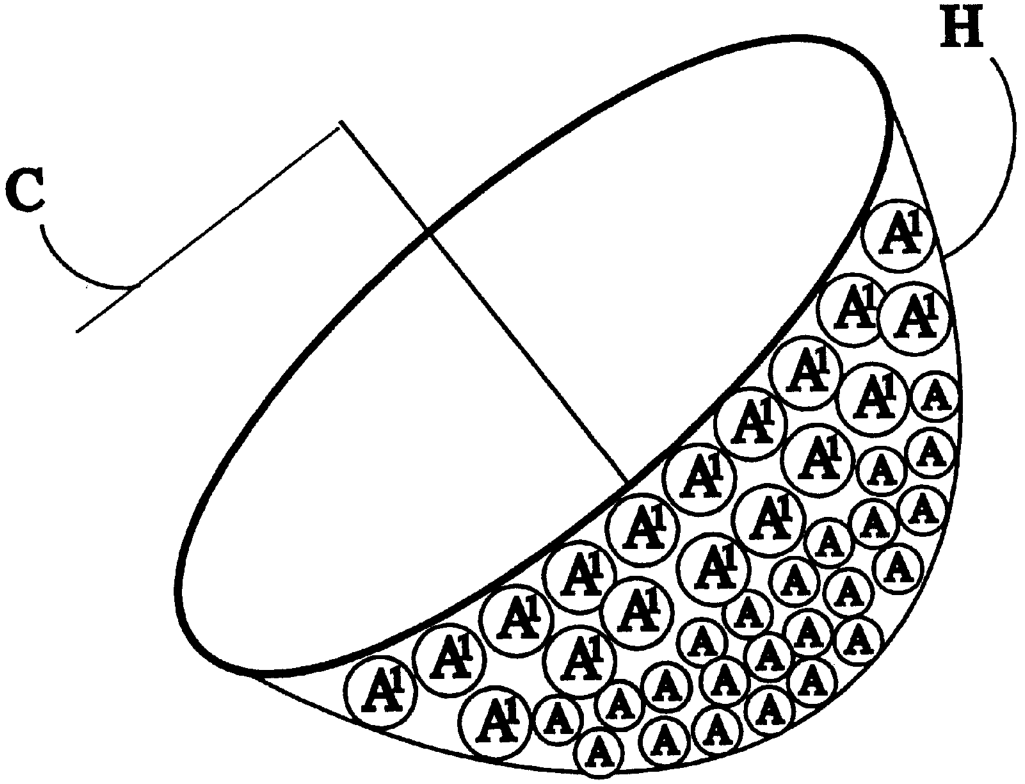
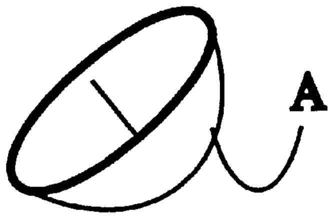
FIG. 11B
FIG. 11C
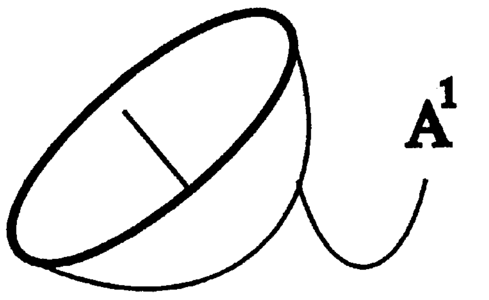

FIG. 12
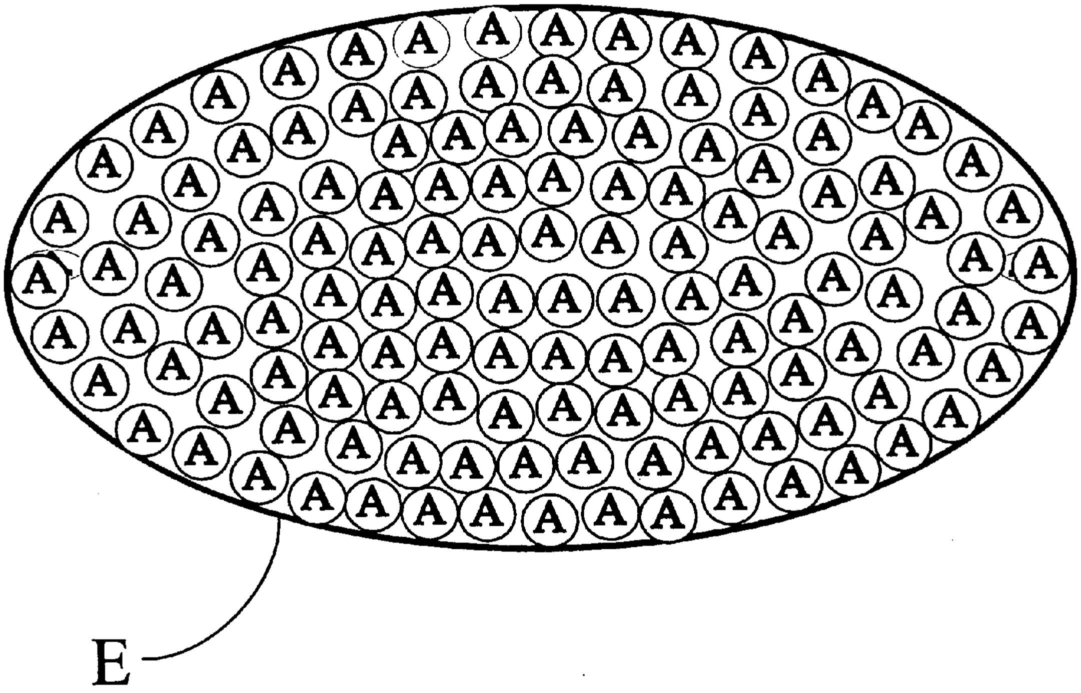
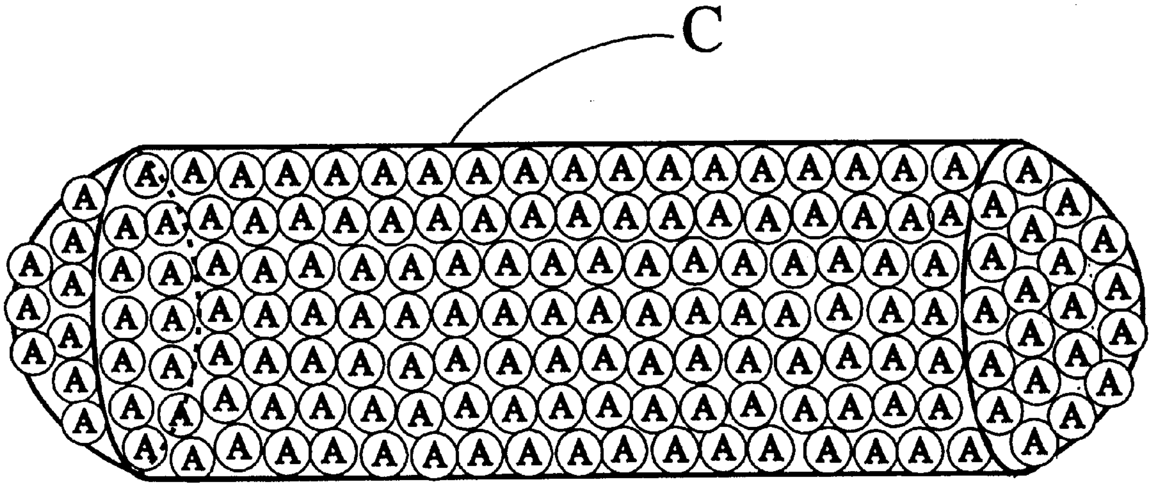
FIG. 13

AGGREGATION OF SHAPED DIRECTIONAL RECEIVING ANTENNA ARRAY FOR IMPROVED LOCATION INFORMATION

BACKGROUND OF THE INVENTION

Purpose of the invention: General Statement of the problem

Improve reception of wireless broadcast signals from users by sampling an array of directional antennae to derive the local transmission field strength.

The basic method uses a lumped location model as an approximation to computationally isolate dispersed multi-user transmission.

Methods utilizing this approach rely on a combination of antennas and signal processing to receive user transmissions.

Application Examples

1CDMA multi-user detection and demoduation

2FDMA, TDMA and GSM multi-user detection and demodulation.

3SDMA multi-user detection and demodulation.

4Other Spread spectrum multi-user detection and demodulation

5Detection and demodulation of start of communication in any of the above application examples.

Prior Art Approaches

Overview

This section discusses location determination based upon several different kinds of antennas:

Single omni-directional antenna determination.

Lee style pair of receiving antennas to minimize cochannel interference.

Phased array background

Macro-diverse location determination

Single omni-directional antenna determination.

Basic Mechanism

Advantages

Disadvantages

Lee style pair of receiving antennas to minimize cochannel interference.

Basic Mechanism

Advantages

Disadvantages

Directional antenna discussion

Phased array background

Basic Mechanism

Advantages

Disadvantages

D3

Domed Lens phased arrays

Basic Mechanism

Advantages

Disadvantages

Circular Phased Arrays

Basic Mechanism

Advantages

Disadvantages

Macro-diverse location determination

Basic Mechanism

Advantages

Disadvantages

D3

Spectrum Patent 1

Very Large Array and other long distance interferometers

REFERENCES

1Viterbi, Andrew J., *CDMA: principles of spread spectrum communication,* (c) 1995, Addison Wesley Longman, Inc., ISBN 0-201-63374-4

2Mouly, Michel and Marie-Bernadette Pautet, *The GSM System for Mobile Communications,* (c) 1992, Mouly and Pautet, ISBN 2-9507190-0-7

3Lee, William C. Y., *Mobile Cellular Telecommunications: Analog and Digital Systems,* $2^{nd}$ ed., (c) 195, 1989 McGraw Hill, Inc., ISBN 0-07-038089-9 a. Chapter 5: "Cell-Site Antennas and Mobile Antennas"

b. Chapter 6: "Co-channel Interference Reduction"

4Mehrota, Asha, *Cellular radio: analog and digital systems,* (c) 1994 Artech House, Inc., ISBN 0-89006-731-7

5Sreetharan, Mothothamby and Rajiv Kumar, *Cellular digital packet data,* (c) 1996 Artech House, Inc., ISBN 0-89006-709-0

6Toh, C-K, *Wireless ATM and ad-hoc networks: protocols and architectures,* (c) 1997 Kluwer Academic Publishers, ISBN 0-7923-9822-X 7Monzingo, Robert A., *Introduction to adaptive arrays,* (c) 1980 John Wiley and Sons, Inc., ISBN 0-471-05744-4

8Simon, Marvin K., Jim K. Omura, Robert A. Schultz, Barry K. Levitt, *Spread Spectrum Communications,* vol. III, (c) 1985 Computer Science Press, Inc. ISBN 0-88175-015-8 (v. III), ISBN 0-88175-017-4 (Set)

9Balanis, Constantine A. *Antenna Theory: Analysis and Design,* (c) 1982 Harper & Row, Publishers, Inc., ISBN 0-06-040458-2

10Shannon, Claude E. and Warren Weaver, *The Mathematical Theory of Communication,* (c) 1949 Board of Trustees of the University of Illinois, Illini Books edition, 1963, ISBN 0-252-72548-4

11Gibson, Jerry D. (editor) *The mobile communications handbook,* (c) 1996 CRC Press, Inc., ISBN 0-8493-8573-3

12Sklar, Bernard, *Digital Communications: Fundamentals and Applications,* (c) 1988 P. T. R. Prentice Hall, ISBN 0-13-211939-0

13Wilson, Stephen G., *Digital Modulation and Coding,* (c) 1996 Prentice-Hall, Inc., ISBN 0-13-210071-1

14Kesteloot, Andre, Charles L. Hutchinson and Joel P. Kleinman (editors), *The ARRL Spread Spectrum Sourcebook,* (c) 1991 American Radio Relay League, ISBN 0-87259-317-7

15Papas, Charles Herach, *Theory of electromagnetic wave propagation,* (c) 1965, 1988 Charles Herach Papas, Dover edition, ISBN 0-486-65678-0

16Doble, John, *Introduction to radio propagation for fixed and mobile communications,* (c) 1996 Artech House, Inc., ISBN 0-89006-529-2

17Straw, R. Dean, Gerald L. Hall, Brian Beezley, *The ARRL Antenna Book,* (c) 1994 American Radio Relay League, ISBN 0-87259-473-4

18Danzer, Paul, Joel P. Kleinman, R. Dean Straw (editors), *The ARRL Handbook for Radio Amateurs,*

$75^{th}$ edition, (c) 1997 American Radio Relay League, ISBN 0-87259-178-6

19Johnson, Richard C., Henry Jacik (ed.), *Antenna Engineering Handbook* $3^{rd}$ ed., (c) 1993, 1984, 1961 McGraw-Hill, Inc., ISBN 0-07-032381-X 20Lo, Y. T., S. W. Lee (ed.), *Antenna Handbook vol II: Antenna Theory,* (c) 1993 Van Nostrand Rheinhold, ISBN 0-442-01593-3 a. Lo, Y. T., "Array Theory", Chapter 11
b. Mailloux, R. J., "Periodic Arrays", Chapter 13
c. Lo, Y. T., "Aperiodic Arrays", Chapter 14
d. Rahmat-Samii, Y., "Reflector Antennas", Chapter 15
e. Lee, J. J., "Lens Antennas", Chapter 16

21Lo, Y. T., S. W. Lee (ed.), *Antenna Handbook vol III: Applications,* (c) 1993 Van Nostrand Rheinhold, ISBN 0-442-01594-1 a. Tang, Raymond, "Practical Aspects of Phased Array Design", Chapter 18

22Courant, R. and D. Hilbert, *Methods of Mathemtical Physics vol. I,* Chapter 1: "The Algebra of Linear Transformations and Quadratic Forms", (c) 1937 Julius Springer, Berlin, $1^{st}$ English edition, republished by John Wiley & Sons, 1989, ISBN 0-471-50447-5.

23Kaiser, Gerald, *A friendly guide to wavelets,* (c) 1994 Birkhauser, Boston, ISBN 0-8176-3711-7

Patent References

24Stangel, John J., et. al., U.S. Pat. No. 3,755,815, "Phased Array Fed Lens Antenna", filed Dec. 20, 1971, issued Aug. 28, 1973

25Giannini, Richard J., U.S. Pat. No. 3,816,830, "Cylindrical Array Antenna", filed Nov. 27, 1970, issued Jun. 11, 1974.

26Stangel, John J., et. al. U.S. Pat. No. 4,451,831, "Circular array scanning network", filed Jun. 29, 1981, issued May 29, 1984

SUMMARY OF THE INVENTION

Definitions

Convex shape

Normal

Antenna
- Directional
- Omnidirectional

Antenna Attributes

Antenna Array
- Phased array
- Dual cochannel interference cancelling
- Micro-diverse
- Macro-diverse Goal of this family of mechanisms Improved ability to isolate user transmissions by means of geometrically partitioning the space-time delay domain of transmission.

This geometrical partitioning is made possible by the geometry of the claimed antenna arrays and claimed signal processing which is derived based upon the claimed antenna array geometry.

Basic Mechanism

A micro-diverse directional antenna array positioned proximately upon the boundary of a convex shape whereby the primary attenuation lobes of neighboring antennae overlap. This creates a situation in which the reception of signals by said array from the space-time-delay domain of transmission can be effectively modeled as a banded linear transformation upon discretized space-time-delay domain of transmission yielding the antenna reception at discrete time steps.

The discretized space-time-delay domain of transmission has a favored coordinate system which will be seen to simplify calculation of said linear transformation. Said banded linear transformation is an approximation of the collective attenuation map of the antenna array. Said banded linear transformations under very broad conditions are known to be invertible with numerically stable inverses, which are also banded. Said numerically stable inverse implies that the discretized space-time-delay domain of transmission can be derived by a said inverse of said banded linear transformation of the discretized space-time-delay domain of transmission applied to the discretely sampled received signals by said antenna array over time.

Stated in an mathematically equivalent form: The discretized space-time-delay domain of transmission can be approximately derived from a collection Finite Impulse Response filters applied to the antenna array reception samples. The issue of side lobes is rendered secondary and the issue of structuring the attenuation contour map to support acceptable linear transformations, thus leading to a new paradigm in antenna architecture.

Basic Advantages

The entire discretized space-time-delay user transmission domain can be approximated by the filtered reception of said antenna arrays. This has the advantage of isolating the number of cellular users to be processed to a reasonable number for base station call processing in application situations experiencing extremes in user density.

This has the advantage of providing a significant processing gain to the reception of start of communications messages from wireless communications system users.

This has the advantage of providing a means of isolating much of the multi-path components of user transmission into manageable time-step related dispersion patterns, which can then be integrated to increase processing gain.

Use of two or more of these antenna arrays in a macro-diverse configuration further refines said approximation of the discretized space-time-delay user transmission domain.

Said refinements increases the accuracy of said models. Said increases in accuracy bring greater gain to the derived received signals of the user transmission domain.

Versions of the invention which cover a symmetric convex shape's surface, such as a sphere's or octagon's, with symmetrically positioned and oriented directional antennae will possess symmetric attenuation contour maps, which means that there will be no non-uniform side lobes.

BRIEF DESCRIPTION OF THE DRAWINGS

FIG. 9 embodies a hemisphere H proximately covered by a multiplicity of direction antennae of more than one aperture size.

FIG. 10 alternatively embodies a hemisphere H proximately covered by a multiplicity of direction antennae of more than one aperture size.

FIG. 11 alternatively embodies a hemisphere H proximately covered by a multiplicity of direction antennae of more than one aperture size.

FIG. 12 depicts an ellipsoidal directional antenna array

FIG. 13 depicts a cylindrical directional antenna array

DETAILED DESCRIPTION

Figure 1:
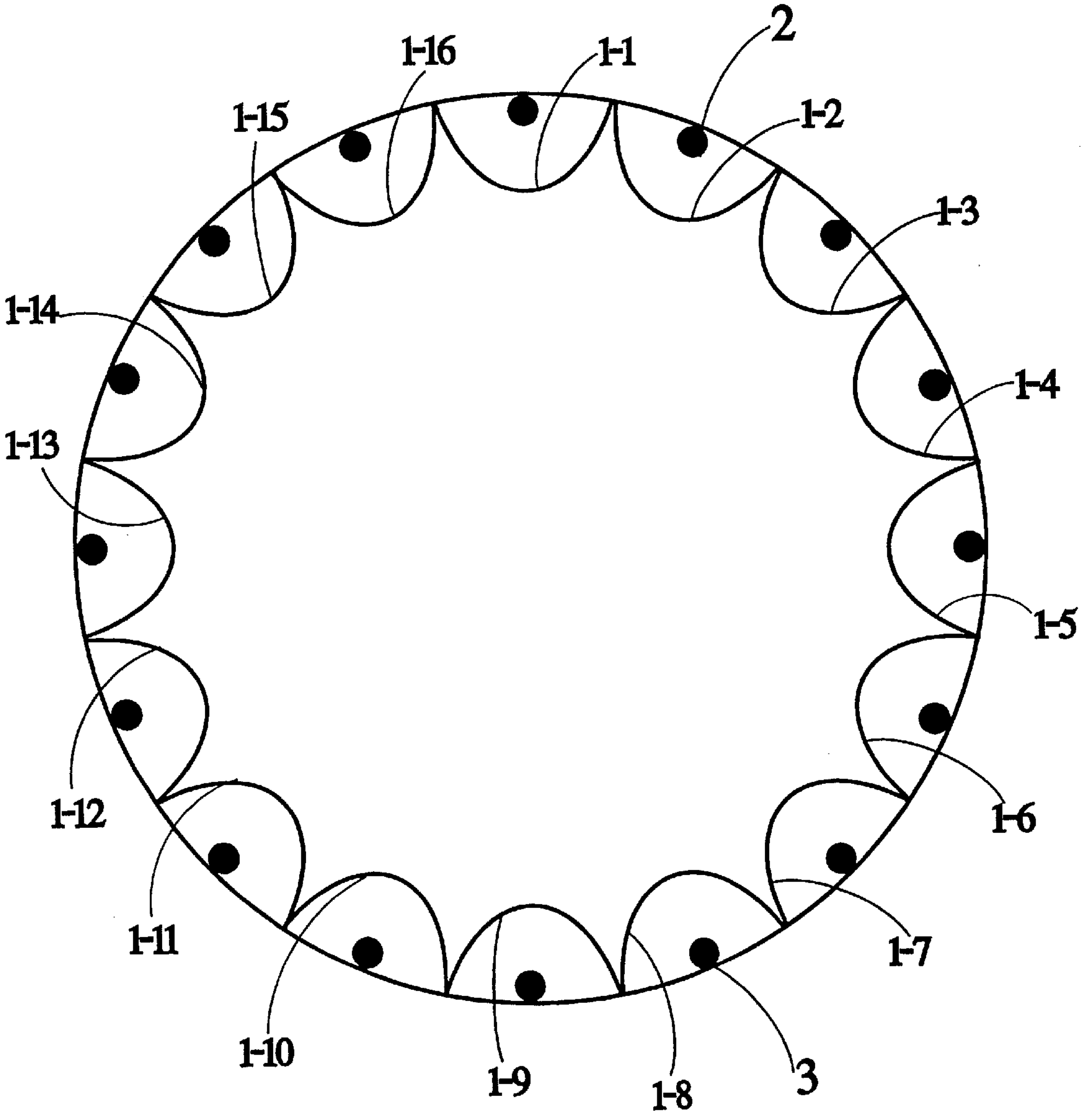
FIG. 1 depicts a 2-D circular array of directional antenna array embodiment.
Figure 2A:
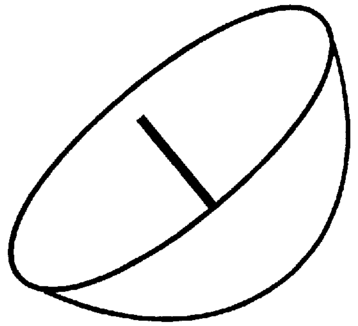
FIG. 2 depicts a typical directional antenna components.
Figure 2B:
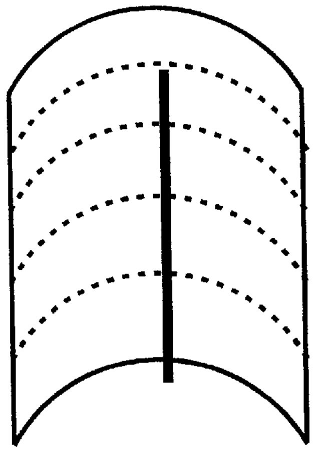
Figure 2C:
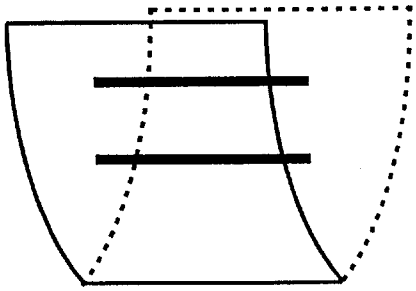
Figure 2D:
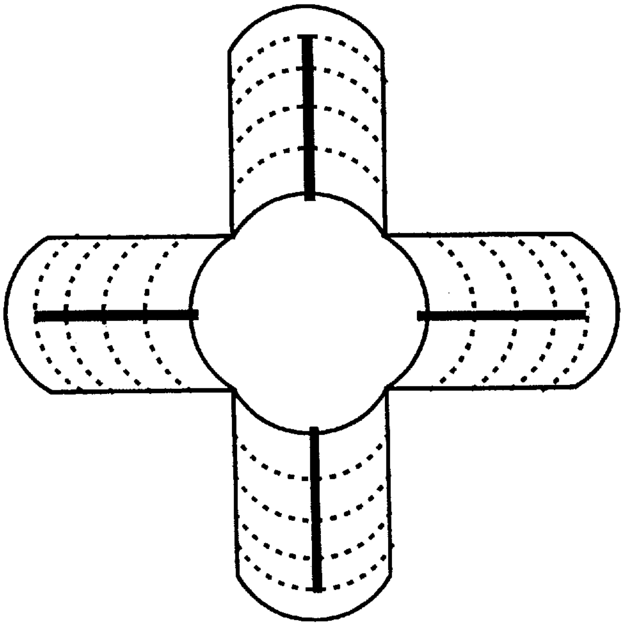
Figure 3:
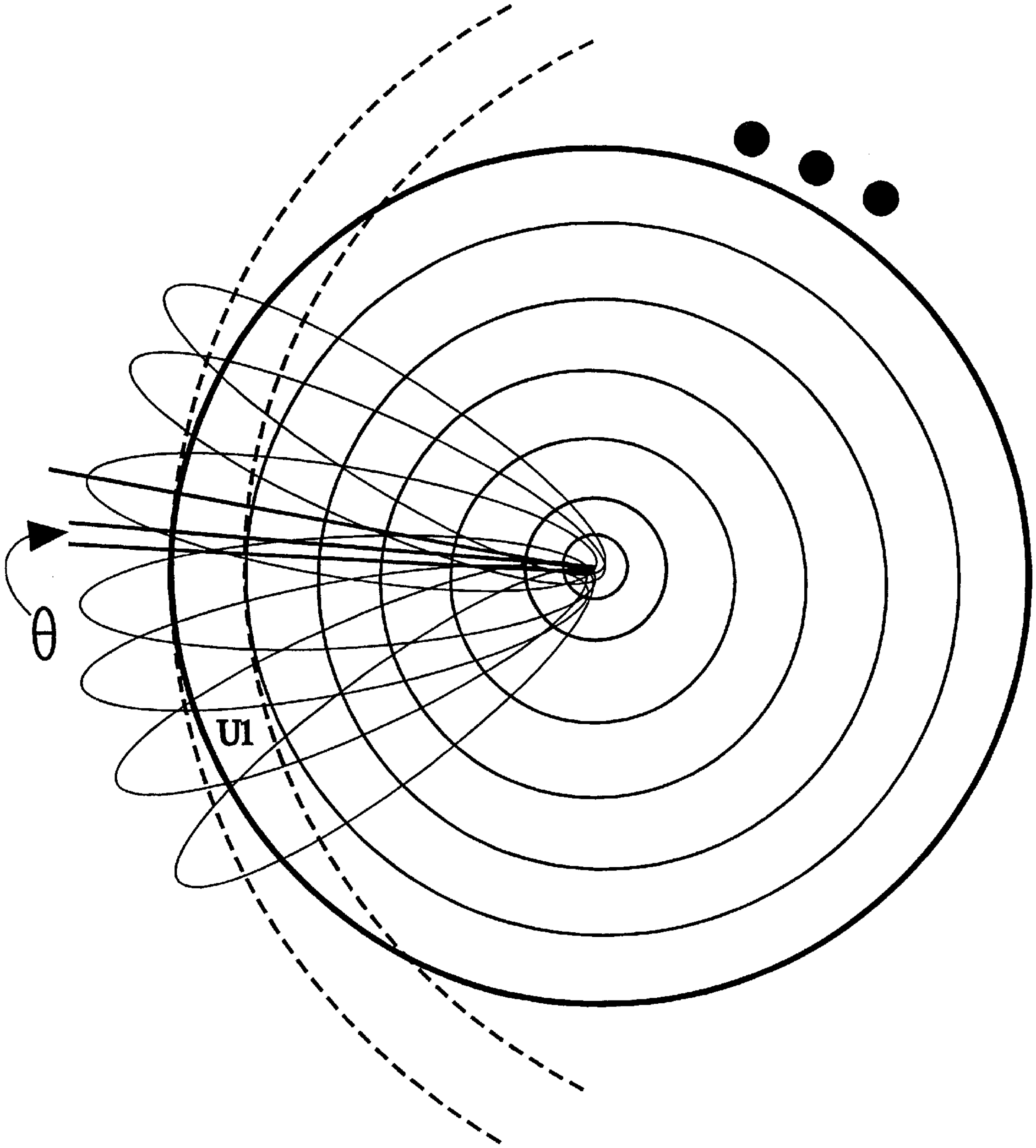
FIG. 3 depicts a basic 2-D picture of space-time-delay user transmission domain relative to the antenna array coordinate system and collective attenuation contour map.

Directional antenna circular array (FIG. 1, 2 and 3)

Overview:

Consider FIG. 1: Disclosed therein is a collection of reflector directional antennae wherein the component directional antenna architecture incorporates two or more of the directional antenna components disclosed in but not limited to FIG. 2.

The 2-D attenuation contour map of the primary lobes of each of the directional antennae is shown superimposed in FIG. 3.

FIG. 1:

The preferred embodiment is an array of 16 directional reflector antenna components arranged optimally in a uniform pattern such that the reflecting surfaces associated with said directional antenna components form a connected surface when in operation.

Note that any of the four basic directional antennas disclosed in FIG. 2 can be used as the component directional antenna to give four distinct embodiments. Note also that the number of directional antenna components may vary. Certain preferred embodiments will utilize more than one type of directional antenna component, or may vary the parameters of said directional antenna components, such as aperture width.

It is apparent to one skilled in the art, that the 2-D attenuation contour maps will differ depending not only on which type of directional antenna is used, but also on the carrier frequency(ies) employed, the length of the antenna elements, shape of the reflectors and the geometric parameters characterizing the relationship between the antenna element and reflector of each antenna component.

While these are relevant and essential issues which must be addressed in developing working antenna systems, these issues tend to obscure the architectural issues which are central to this invention. They will not be mentioned hereafter because of this. The discussion of attenuation will instead focus on a general discussion so that the primary insights and their application to this invention will be less clouded in detail.

The directional antenna components are denoted by 1—1 to 1–16 Each directional antenna component is comprised of a reflector, and one or more radiating components designated by 2. Note that only one directional antenna component has had its radiating components designated, but that all directional antenna components have appropriate radiating components.

There is a membrane 3 which encapsulates the antenna array so that the array presents a smooth surface to the external environment. The membrane is composed of one or more materials which are transparent to the operational frequencies of the antenna array.

In certain preferred embodiments, portions of the membrane covering a given antenna component may be opaque to certain frequencies or polarizations used by adjacent antenna components.

In some preferred embodiments, said radiating elements of said directional antenna components are not in line of sight with each other. The reflector components of said directinal antenna components block line of sight. This situation has the advantage of limiting the inductive coupling of one radiating component of a directional antenna component upon the radiating component of an adjacent directional antenna component's radiating component.

The discussions of covering membranes and line of sight issues for the radiating components of the directional antenna components apply to all discussed preferred embodiments hereafter and will not be repeatedly discussed in the interest of brevity.

FIG. 2:

This invention will focus its discussion but is not limit its claims to four basic directional antenna components, all of a reflector type. In any of the directional array antenna configurations, unless explicitly noted, similar application discussions could be developed based upon all the components listed in this FIG. and discussed hereafter.

Type A directional antenna component:

This preferred embodiment is a parabolic reflector antenna with radiating component approximately located along the major axis of the paraboloidal reflector. The radiating component will be assumed to be attached approximately along this axis to the reflector.

Note that in some preferred embodiments, the radiating component may optimally be a helical configuration.

The base location vector will be considered to be the point of intersection of the major axis and the reflector surface. The orientation direction vector will be defined to be the vector from the base location vector which ends at the extreme end of the radiating component.

Type A1 directional antenna component:

This preferred embodiment is a parabolic sheet reflector antenna with radiating component approximately located along the focal line of the parabolic sheet reflector. The radiating component can be considered to be a rigid wire attached to the reflector sheet in any of several ways including but not limited to being attached at the ends or being attached to the back of the sheet.

Dipole versions of A1 are preferred embodiments in some applications wherein the radiating component is comprised of two rigid wires instead of one. Dipole wiring is well understood in the art, with typical attachment of antenna feed being in the midpoint of the radiating component.

The base location vector will be considered to be the point of intersection of the major axis and the reflector surface. The orientation direction vector will be defined to be the vector from the base location vector which ends at the extreme end of the radiating component.

Type A2 directional antenna component:

This preferred embodiment is a parabolic sheet reflector antenna with radiating component approximately located along the major axis of the parabolic sheet reflector. The radiating component can be considered to be a pair of parallel rigid wires attached to the reflector sheet in any of several ways including but not limited to being attached at the ends or being attached to the back of the sheet.

In certain preferred embodiments either radiating component the wire closer or further away from the reflector sheet will reside at the focal line of the reflector sheet. Certain preferred embodiments will incorporate a distance between the two radiating component wires which is related to the carrier wavelength. Certain preferred embodiments will incorporate radiating component wires of differing length.

Dipole versions of A2 are preferred embodiments in some applications wherein the radiating component is comprised of two rigid coplanar wires are used instead of one wire in one or both of the wire components of the radiating components. Dipole wiring is well understood in the art, with typical attachment of antenna feed being in the midpoint of the radiating component.

The base location vector will be considered to be the midpoint of the reflector surface.

The orientation direction vector will be defined to be the vector from the base location vector which ends at one end of the furthest wire radiating component. The choice of which end is arbitrary, but should be consistent within instances of this class of components in a specific embodiment such that antenna polarization can be derived in a consistent fashion.

Type A4 directional antenna component:

This preferred embodiment is a quadra-pole parabolic sheet reflector antenna with radiating component approximately located along the focal lines of the four parabolic sheet reflectors. Each said radiating component can be considered to be a rigid wire attached to said corresponding reflector sheet in any of several ways including but not limited to being attached at the ends or being attached to the back of the sheet.

Preferred embodiments include use of two or more rigid wires in each of the four radiating components in a fashion as disclosed in the discussion of A2 directional antenna coponents above.

The base location vector will be considered to be the point of intersection of the midpoint lines of the four reflector surfaces. The orientation direction vector will be defined to be the vector from the base location vector which ends at an end furthest removed from the base location vector of the furthest wire radiating component. Which one of said radiating components is arbitrary, but should be consistent within instances of this class of components in a specific embodiment such that antenna polarization can be derived in a consistent fashion.

FIG. 3:

A schematic view of the contour map of a typical attenuation function of such a circular directional antenna array.

The coordinate frame used hereafter is constructed as follows: A polar coordinate system is used. Radial distance is in units of the propagation distance within the medium traversed in the sampling time step. Angular measure is taken relative to some axis. This axis can be arbitrarily chosen in theory.

However, the practical choice will be to make optimal use of the uniformity of the antenna array. Best choices are to design the array to have a multiple of 4 directional antenna components. The angular measures would then be done from an axis chosen so that the contour map of the primary attenuation lobes is as symmetrical as possible to simplify calculations.

Figure 4:
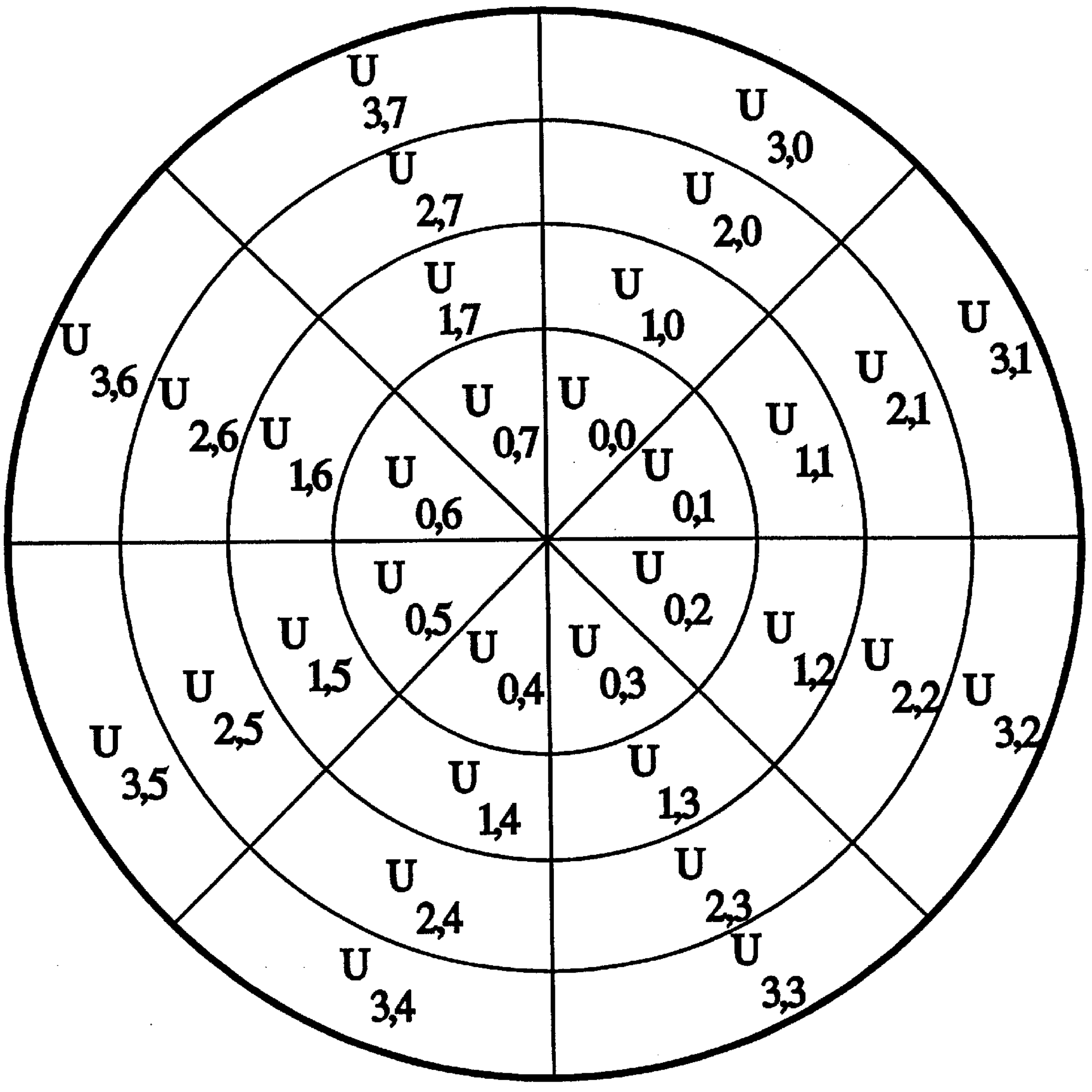
FIG. 4 depicts a discrete user domain where $\theta=\pi/4$ modeling 4 sampling time step radii
Figure 5:
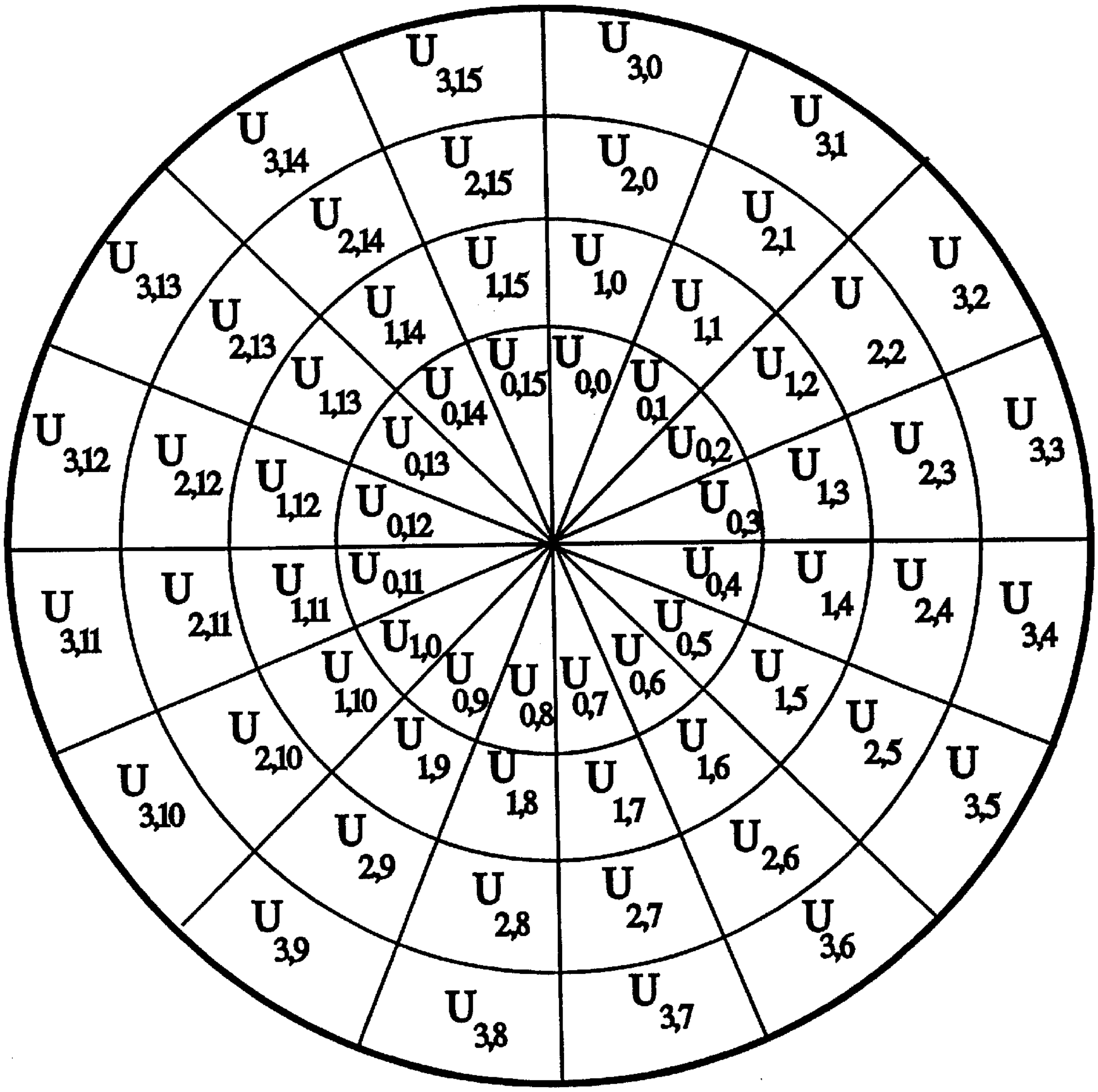
FIG. 5 depicts a discrete user domain where $\theta=\pi/8$ modeling 4 sampling time step radii

Discrete models of the user transmission domain (FIGS. 4 and 5):

FIGS. 4 and 5 shows two discrete models of the user domain in said coordinate system. In FIG. 4, $\theta=\pi/4=2\pi/8$. Four layers of sampling are shown, corresponding to 5 time steps removed from current time, due to the time to propagate. In FIG. 5, $\theta=\pi/8=2\pi/16$. Five layers of sampling are shown, corresponding to six time steps removed from current time, due to the time to propagate.

Let us generalize the situation discussed in these two FIGS.: Assume that the user transmission domain is discretely partitioned into KLN areas where

- K is the radial distance units in signal propagation of time step duration in the communication medium before the signal is too weak to be received.
- N is the number of directional antenna components in the claimed 2-D array embodiment
- L is an integer where $\theta=2\pi/LN$.

Let U[t,j,k] be the state of the discretized user transmission domain at time step t, radius $jc\Delta T$ polar coordinate $k\theta$.

where

- t is a discrete value, assumed to be the integers
- k ranges from 1 to LN.
- j ranges from 0 to K−1.
- c is the propagation rate in the communicating medium, which is assumed constant in this discussion.
- $\Delta T$ is the sampling timestep.

Note that this analysis assumes that only a scalar such as signal strength is being described at U[t,j,k]. In some preferred embodiments, more sophisticated assumptions are optimal. However, the basic discussion outlined here will remain applicable, though the mathematics will become more complicated. Let R[i,t] be a vector of sampled states for antenna component i, where i ranges from 1 to N at discrete time step t.

In certain preferred embodiments, R[i,t] can be the sampled state of a collection of filters, including but not limited to bandpass, sub-band and discrete wavelet based filters.

In certain preferred embodiments, R[i,t] can be the sampled states of a multiplicity of specific radiating elements within the radiating component(s) of each said directional antenna component. These sampled states may be further modified by phase alignment and signal combining techniques which are known in the art.

It can be seen that each sampled state of said directional antenna components is modeled as a linear function of the user transmission domain state generated in the past. This is due to the finite propagation speed of the communicating medium.

Consider the attenuation contour map 3. Each directional antenna component receives a time-displaced contribution from each user transmission domain component. This can be approximated by a linear combination of the time-displaced contributions of said discrete user transmission domain components. Let A[i,j,k] be the linear contribution factor for antenna component i, from time-displaced user component jcΔT at polar coordinate kθ. Thus the contribution to R[i,t] by U[t−j,j,k] is scaled by A[i,j,k]. Note that each A[i,j,k] component is a vector of the same size as R[i,t]. Thus the matrix A can be seen as a 4-D matrix of real numbers, which may reasonably be embodied as floating point numbers and in many cases approximated further as fixed point numbers.

Given the above discussion, we can assume the following linear equation system approximately describes the relationship between the discretized user transmission domain and the reception state vector of the claimed antenna arrays:

$$R[i,t] = \sum_{j=1}^{K}\sum_{k=1}^{LN} A[i,j,k]U[t-j,j,k]$$

$$= \sum_{j=1}^{K}\sum_{k=1}^{LN} A[i,j,k]U[t-j,j,k]$$

The question at hand becomes how to extract information about U from knowledge of A and R. Linear Algebra teaches us readily that the system of linear equations above can only be solved if there are as many terms R as there are terms U.

This condition will be met if there are KL linearly independent samples and/or quantities taken or derived from each sampling time step at each directional antenna component. The following considerations will be relevant in a broad class of preferred embodiments:

There could be K such filter banks for each or the N said directional antenna components.

Thus R[i,t] would be a vector with K components.

The above equation system is an FIR(Finite Impulse Response) filter system.

FIR's form banded linear transformations, in that multipliers A[i,j,k] occur at offset locations in each subsequent time step's linear transformation between the user transmission states and the reception state matrix(filtered sub band samples by antenna component) of the antenna array.

Given certain conditions well documented in the mathematical disciplines regarding such systems, inverse linear transformations, also FIR's, exist and are numerically stable.

Such an inverse transformation would have the form $$U[t,j,k] = \sum_{c=1}^{N}\sum_{b=1}^{N}\sum_{a=1}^{K} B[a,b,c]R_a[b,c+t]$$

Ball Antenna Array (FIGS. 6 to 11)

Overview:

The surface of a convex shape (in this case a sphere or hemisphere) is covered by a collection of directional antennae.

Figure 6:
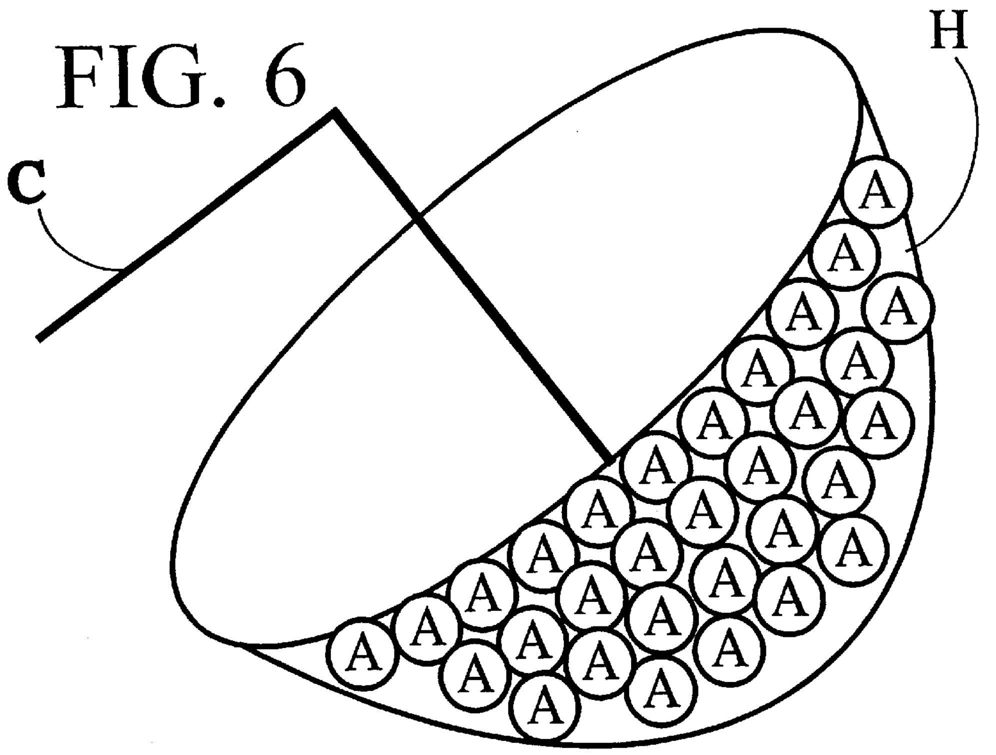
FIG. 6 depicts hemisphere covered on one side by a collection of directional antennae

For simplicity sake, the drawings and discussion that follow will be limited to embodiments of parabolic directional antenna as in A of FIG. 2. This is done only to simplify the document, there are comparable advantages to be found in using the other disclosed antenna components, as well as directional helical antennas. FIG. 6 discloses a hemisphere H which has been covered on one side by a collection of directional antennae A.

One preferred embodiment incorporates the antenna feeds being merged into a cable or conduit C. In certain preferred embodiments, initial signal processing including but not limited to sampling, filter, amplification, down conversion and phase alignment signal processing by additional circuitry may be optimally performed physically proximate to one or all of said directional antenna components or within the interior of said hemisphere. In such situations, the cable or conduit C would carry not only the processed signals out of the device, but may also carry signals into the device. The purpose of these signals may include but is not limited to controls directing the signal processing circuitry. Note that these preferred embodiments are relevant to all claimed embodiments disclosed herein. This paragraphs discussion will not be repeated again for brevity, but is to be assumed for each disclosed directional antenna array.

Figure 7:
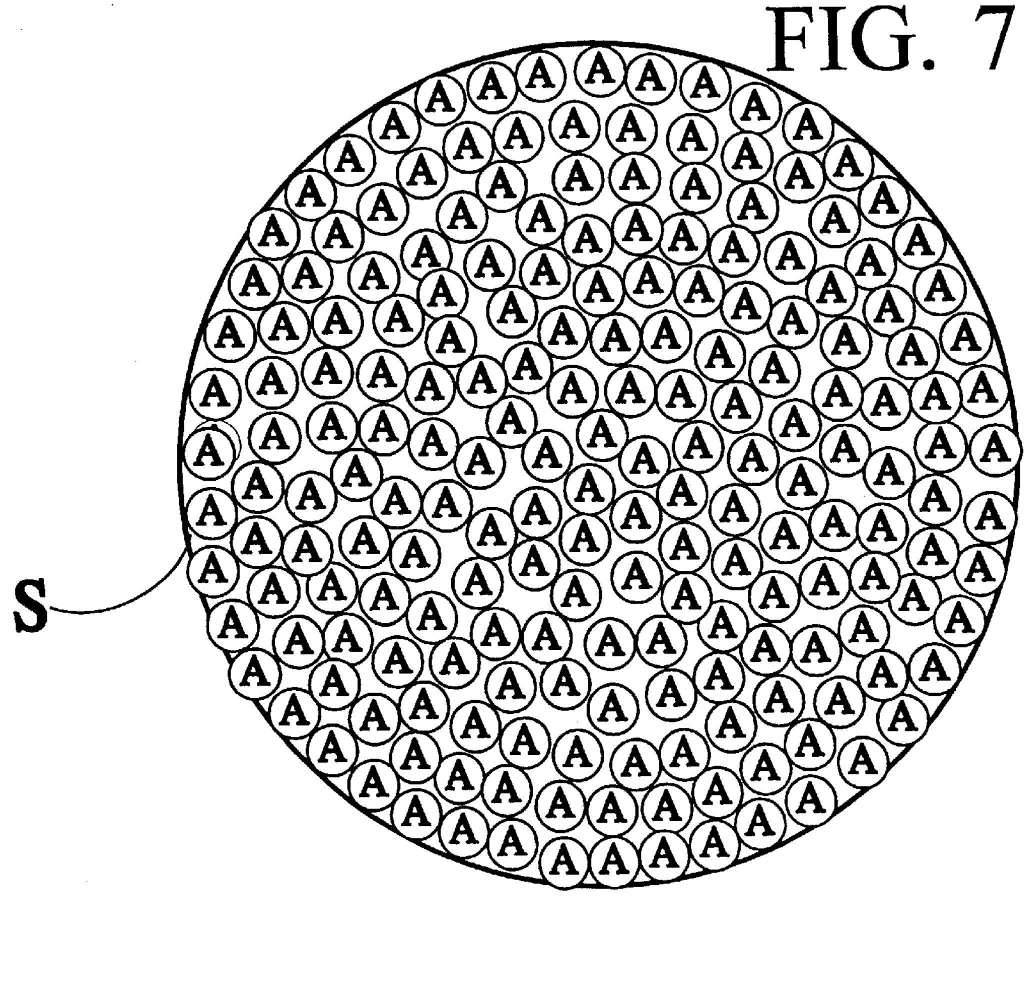
FIG. 7 depicts sphere covered by a collection of directional antennae

In this and the following FIGS., the embodiments will assume that the base location vectors of all said directional antenna components are proximate to the boundary of the convex shape. These directional antenna components are all approximately the same size. FIG. 7 discloses a sphere S which has been covered on one side by a collection of directional antennae A. These directional antenna components are all approximately the same size.

Figure 8:
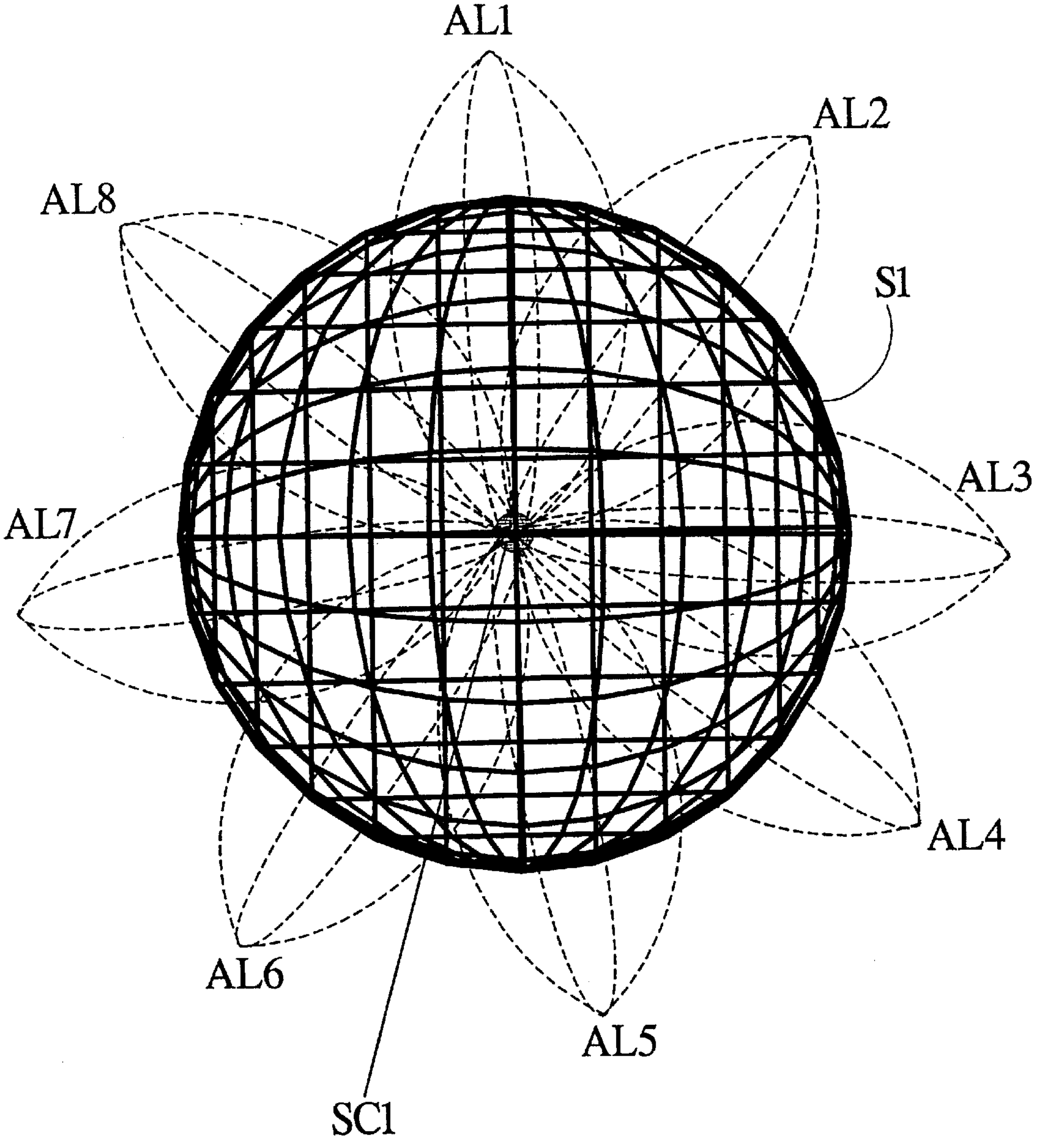
FIG. 8 depicts partial schematic figure showing some of the primary attenuation lobes of directional antenna arrays as in FIGS. 6 and 7

FIG. 8 schematically discloses a portion of the primary attenuation lobes of the directional antenna components of FIGS. 6 and 7.

Note that only the primary attenuation lobes of said antenna components in the plane parallel to the viewing plane have been drawn.

This has been done to limit the complexity of the drawing and to represent that the attenuation nodes in fact pervade 3-dimensional regions.

Note that in specific applications, an embodiment of the mathematical systems analysis found after FIGS. 4 and 5 can be developed. It will be significantly more complicated, but hat the fundamental issues will be similar.

FIGS. 9, 10 and 11 disclose a hemisphere covered by directional antenna components of various sizes.

Note that comparable embodiments covering a complete sphere as well as covering portions of a sphere other than exactly a half-sphere may be preferable in certain applications.

However, the discussions are similar enough that they can be reasonably inferred by one skilled in the art given the enclosed discussion and as such have not been incorporated.

Discussion herein will be limited to hemispheres but are not meant to in any way exclude other such embodiments.

FIG. 9 embodies a hemisphere H proximately covered by a multiplicity of direction antennae of more than one aperture size.

Specifically, antenna components A, $A^1$ and $A^2$ possess distinct aperture sizes.

Note that the largest apertures near the middle of the hemisphere and that the aperture sizes diminish in a progressive fashion toward the perimeter of the covered surface.

This provides more primary attenuation lobes toward the plane of the covered surfaces perimeter plane, which can be advantageous in applications requiring increased resolution in those directions.

FIG. 10 alternatively embodies a hemisphere H proximately covered by a multiplicity of direction antennae of more than one aperture size.

Specifically, antenna components A and $A^1$ possess distinct aperture sizes.

Note that the largest apertures near the middle of the hemisphere and that the aperture sizes diminish in a progressive fashion toward the perimeter of the covered surface.

The distinctive feature in this embodiment is that there are multiple rows of each size.

This can be advantageous in applications requiring increased resolution in those directions and constrained processing capability.

FIG. 11 alternatively embodies a hemisphere H proximately covered by a multiplicity of direction antennae of more than one aperture size.

Specifically, antenna components A and $A^1$ possess distinct aperture sizes.

Note that the largest apertures near the perimeter of the hemisphere and that the aperture sizes diminish in a progressive fashion toward the middle of the covered surface.

This provides more primary attenuation lobes away from the plane of the covered surfaces perimeter plane, which can be advantageous in applications requiring increased resolution in those directions.

Ellipsoidal and convex ended cylinder directional antenna arrays (FIGS. 12 and 13)

Overview:

Two additional embodiments are discussed wherein the convex shapes involved are the ellipsoid and cylinder with convex ends.

There are other convex shapes which may well be preferred in various applications, including but not limited to, the regular solids (tetrahedron, cube, . . . , icosahedron), other convex polyhedrons (cube-octahedrons, etc.) and geodesic domes in 3-D as well as convex polygons and other continuous shapes in 2-D. These embodiments will not be developed here. This is done to limit the complexity of the discussion to central salient points.

As in the above discussion, there are other alternative embodiments incorporating the covering of part of said shapes. It will not be developed here. This is done to limit the complexity of the discussion to central salient points.

As in the above discussion, there are other alternative embodiments incorporating the covering of said shapes with directional antenna components of differing parameters, such as aperture sizes. These will not be developed here. This is done to limit the complexity of the discussion to central salient points.

FIG. 12: Ellipsoidal directional antenna array

This preferred embodiment comprises an ellipse E proximately covered by a multiplicity of direction antennae A of one aperture size. Such embodiments possess non-uniform attenuation contour maps which can be advantageous in certain applications.

FIG. 13: Cylindrical directional antenna array

This preferred embodiment comprises a cylinder C whose ends have been extended with a convex shape, in this case, hemisphere. The surface of C has been proximately covered with directional antenna components A. These embodiments possess non-uniform attenuation contour maps which can be advantageous in certain applications.

Directional antenna ring array application in cellular radio base stations (FIGS. 14 to 17)

Overview

Cellular base station embodiments of this invention offer significant advantages over conventional base station antenna sets (See references [3.*a*] and [3.*b*] regarding conventional base station antenna sets.)

Embodiments comprised of one or more omni-directional receiving antennas plus one or more of the directional antenna arrays as disclosed in this patent provide significant advantage when incorporated into the collector architecture of Cellular Telecom's zone manager/aggregator communications system architecture.

Figure 14:
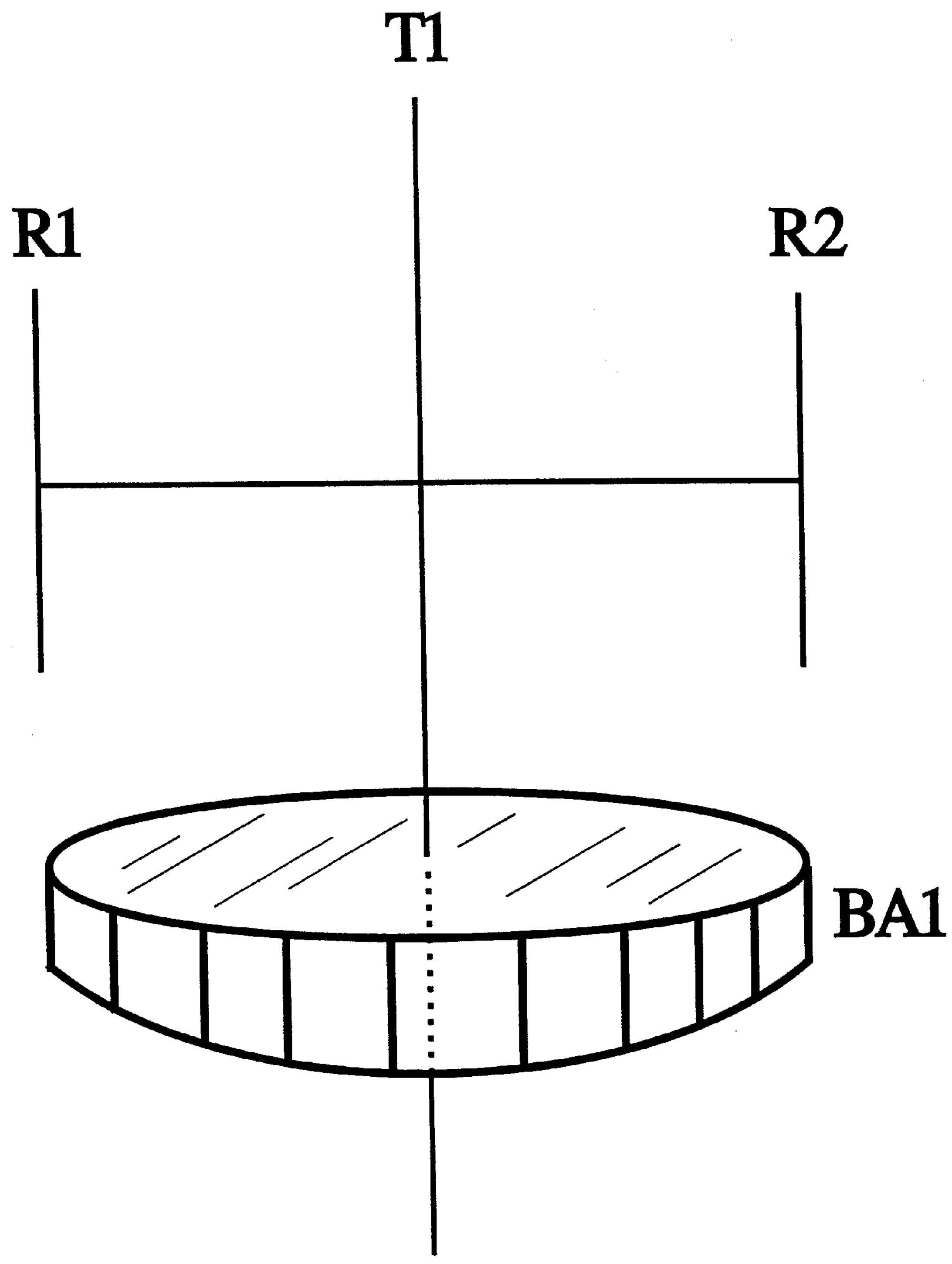
FIG. 14 depicts an improved Antenna Set for Cellular Base Station

FIG. 14: Improved Antenna Set for Cellular Base Station

One preferred embodiment in FIG. 14 incorporates a well known configuration of a transmitting antenna, a pair of omni-directional receiving antennae and a circular array of antennae as disclosed in FIG. 1.

Such embodiments have application in cellular base station designs. The design and configuration of an antenna set composed of the transmitting and dual omni-directional antennas is known in the art and well disclosed in references [3.*a*] and [3.*b*].

Certain preferred embodiments would vary the location of the circular directional antenna array so that they receiving and transmitting were not all approximately colocated. While these have relevance in certain applications, the discussion herein will focus on the embodiment sketched in the FIG..

Certain preferred embodiments would best incorporate other disclosed directional antenna arrays. The notation "BA" used in this and the following diagrams will refer to any appropriate disclosed directional antenna arrays.

Figure 15:
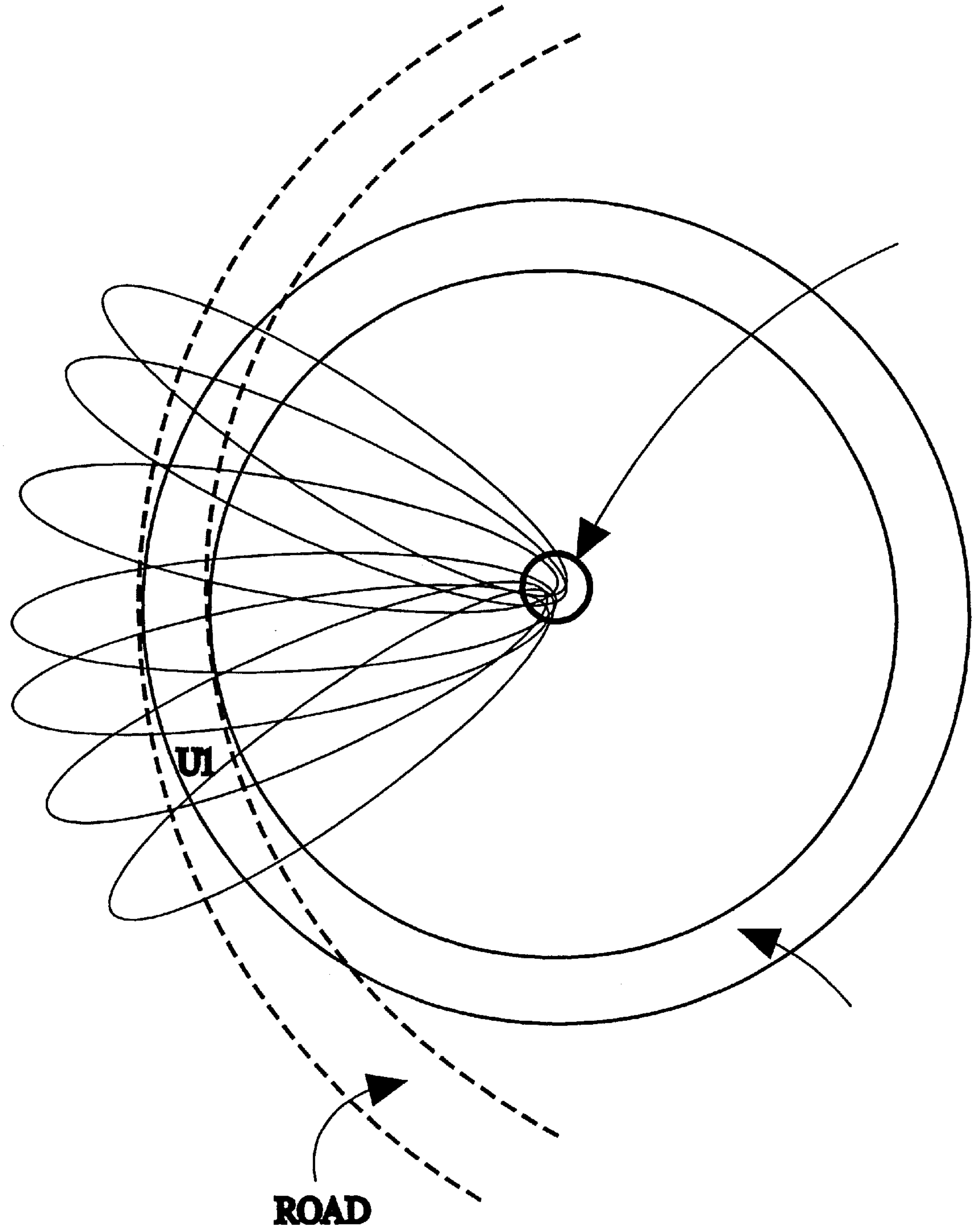
FIG. 15 depicts an application in region possessing major thoroughfare twisting through mountainous region

FIG. 15: Application in region possessing major thoroughfare twisting through mountainous region In this FIG., a single base station is effectively covered a twisted road or freeway through what may well be a mountain gorge. This situation is found in many regions of the world, on practically every continent. The embodiment as in FIG. 14 prefered in this circumstance may well require a partial hemisphere covered with directional antenna components with possibly different aperture widths.

Such embodiments allow for the isolation of users traveling in various portions of the roadway based upon which primary attenuation lobes are being traversed.

Figure 16:
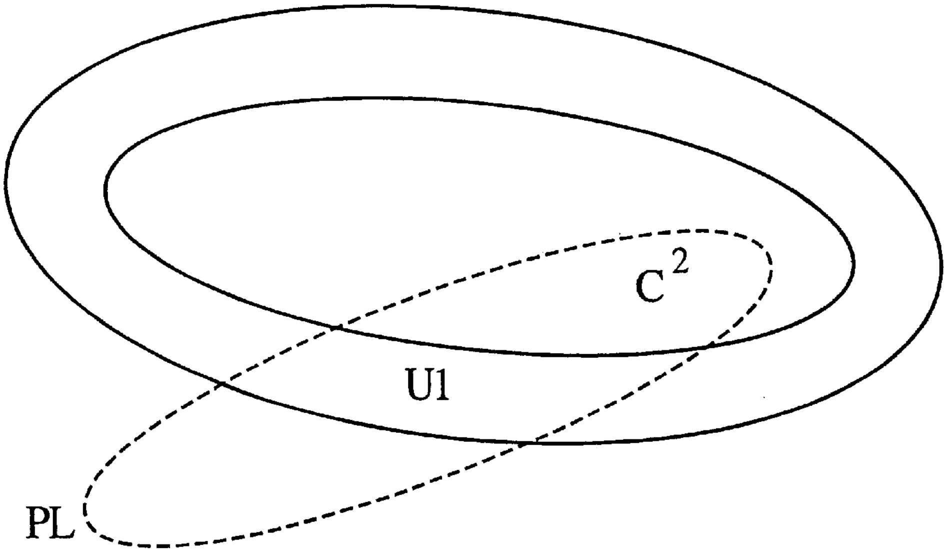
FIG. 16 shows augmentation of location finding capability over strictly omnidirectional receiving antenna set capability

FIG. 16: Showing augmentation of location finding capability over strictly omnidirectional receiving antenna set capability Given a collector comprised of one or more colocated omni-directional receiving antennae for uplink reception, the best that can be done to determine the location of user U1 is an area bounded by ellipses wherein said region comprises the probable location of U1 based upon the delay of arrival of signal relative to some triggering signal emanating from a second source. The second source is at one focal point of the ellipses. The other focal point is occupied by the collector.

The effect of the addition of an embodiment of a disclosed directional antenna array is shown by superimposing the nearest primary attenuation lobe PL of the array. The intersection of the primary attenuation lob and delay of arrival location information significantly refines the location information which can be derived with one collector or base station of this sort.

Figure 17:
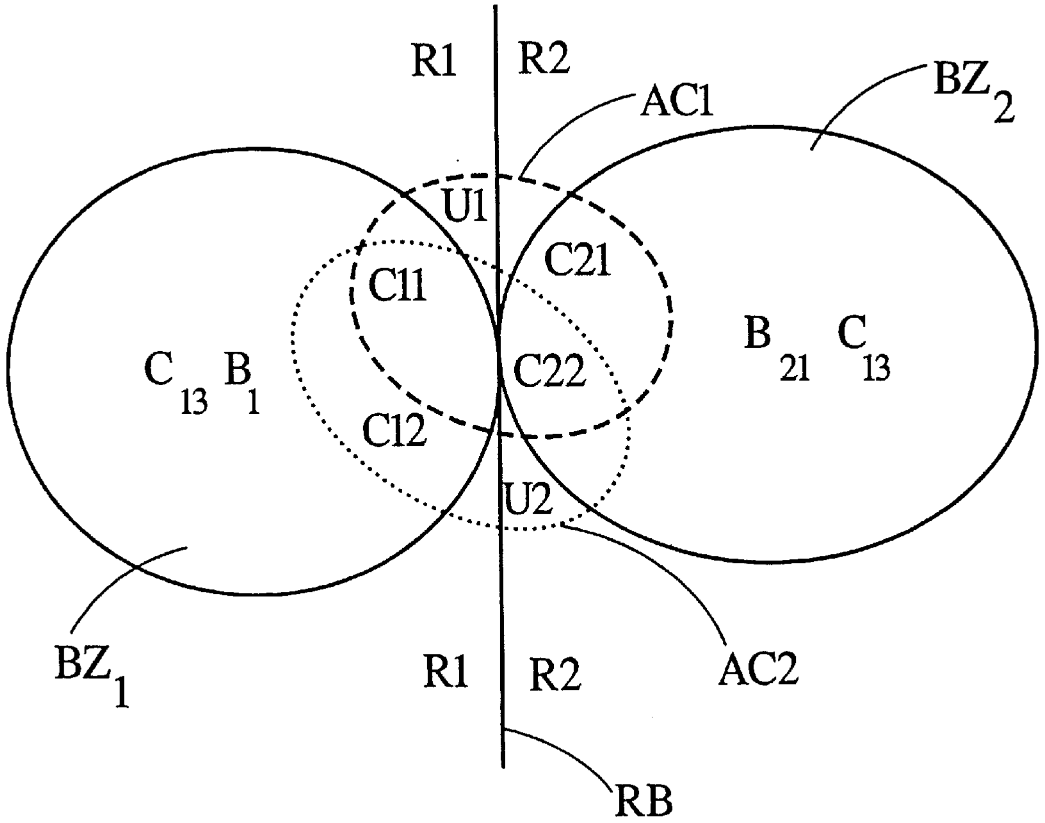
FIG. 17 depicts the allocation of standard collector resources between cellular zones.

FIG. 17: Showing application of improved collector architecture to macro-diverse collector allocation for handoff between cellular zones FIG. 17 is a standard diagram showing the allocation of standard collector resources required to derive adequate location information during handoff between two cellular zones, possibly of different cellular regions. This assumes that each said collector's uplink receivning antennae are omni-directional. In such a case, 3 different macro-diverse collectors are required to locate a user.

Assuming instead use of the disclosed prefered embodiments, each collector would be able to derive the relavant location information for a user. Handoff between zones could then be achieved by two collectors typically.

Figure 18:
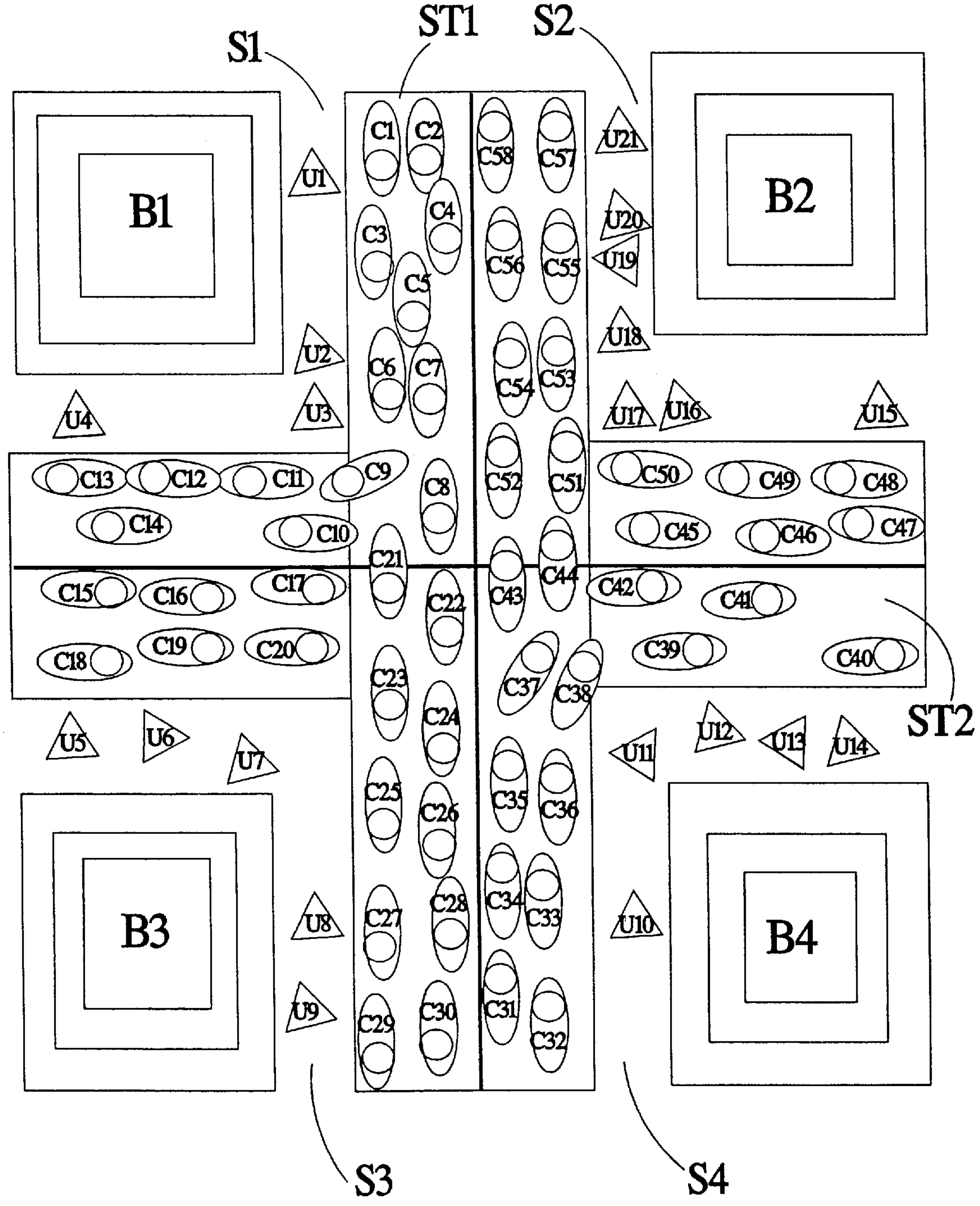
FIG. 18 depicts an overview of problem of user reception in densely concentrated areas users

FIG. 18: Overview of problem of user reception in densely concentrated areas users FIG. 18 is a simplified FIG. showing the basic terms of a problem found in many crowded locations. Depicted is an intersection of two streets ST1 and ST2 in an urban setting bordered by four large buildings B1–B4. Each building has a sidewalk which faces the street. The sidewalks are labeled S1 to S4. A small number of users U1–U21 are displayed walking on the sidewalks. A small number of cars C1–C58 are depicted traversing the streets ST1 and ST2.

Real application areas have large numbers of users and often (but not always) cars in close proximity. Specifics such as number, size, shape and geometric relationship between pedestrian thoroughfares, auto thoroughfares and buildings will vary widely. However, the central discussion remains the same.

Conventional omni-directional receiving antennae as well as "sectorized" directional antennas as disclosed in references [3.*a*] and [3.*b*] are unable to partition these users into cells which are small enough to be effectively processed. A set preferred embodiments will be disclosed next which supports that partitioning. In the FIGS. that follow, BA will stand for any preferred embodiment disclosed to this point in the patent. These embodiment will be referred to as Ball Antenna Arrays hereafter in the specification.

Multiple instances of the same or differing embodiments of the above invention may be preferred inspecific applications.

The following discussion will use the phrase Ball Array to refer to any embodiment of the claimed inventions. This is being done to simplify the discussion and focus on the salient application information.

Figure 19:
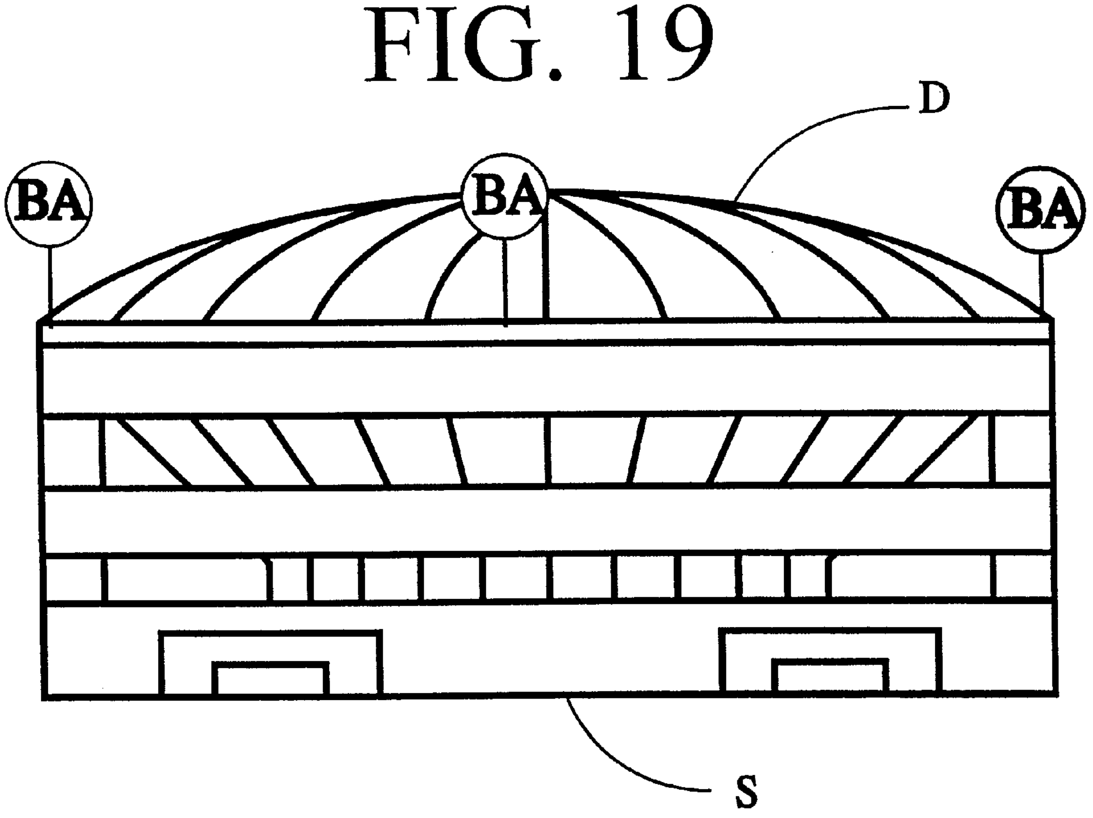
FIG. 19 depicts the use of Ball Arrays positioned outside a domed stadium.

FIG. 19: Use of Ball Arrays positioned outside a domed stadium.

In certain preferred embodiment applications, a domed stadium or other large, enclosed building requires very dense cellular user support outside said building or buildings. Positioning Ball Antenna Arrays at a height above the building or buildings provides the ability to significantly increase cellular density through te previously disclosed discussions of this patent.

Figure 20:
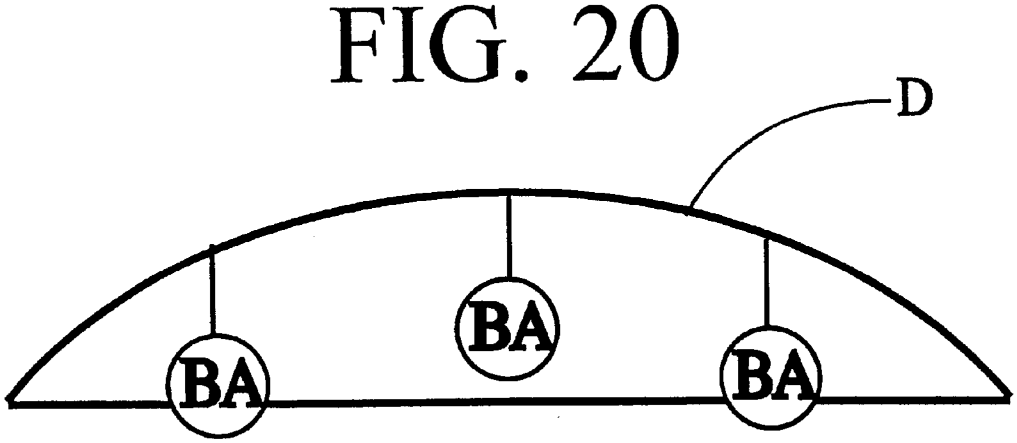
FIG. 20 depicts the use of arrays suspended from the ceiling of a domed stadium.

FIG. 20: Use of Ball Arrays suspended from the ceiling of a domed stadium.

In certain preferred embodiment applications, a domed stadium or other large, enclosed building requires very dense cellular user support within said building or buildings. Positioning Ball Antenna Arrays from the ceiling or dome of said building or buildings provides the ability to significantly increase cellular density through the previously disclosed discussions of this patent.

Figure 21:
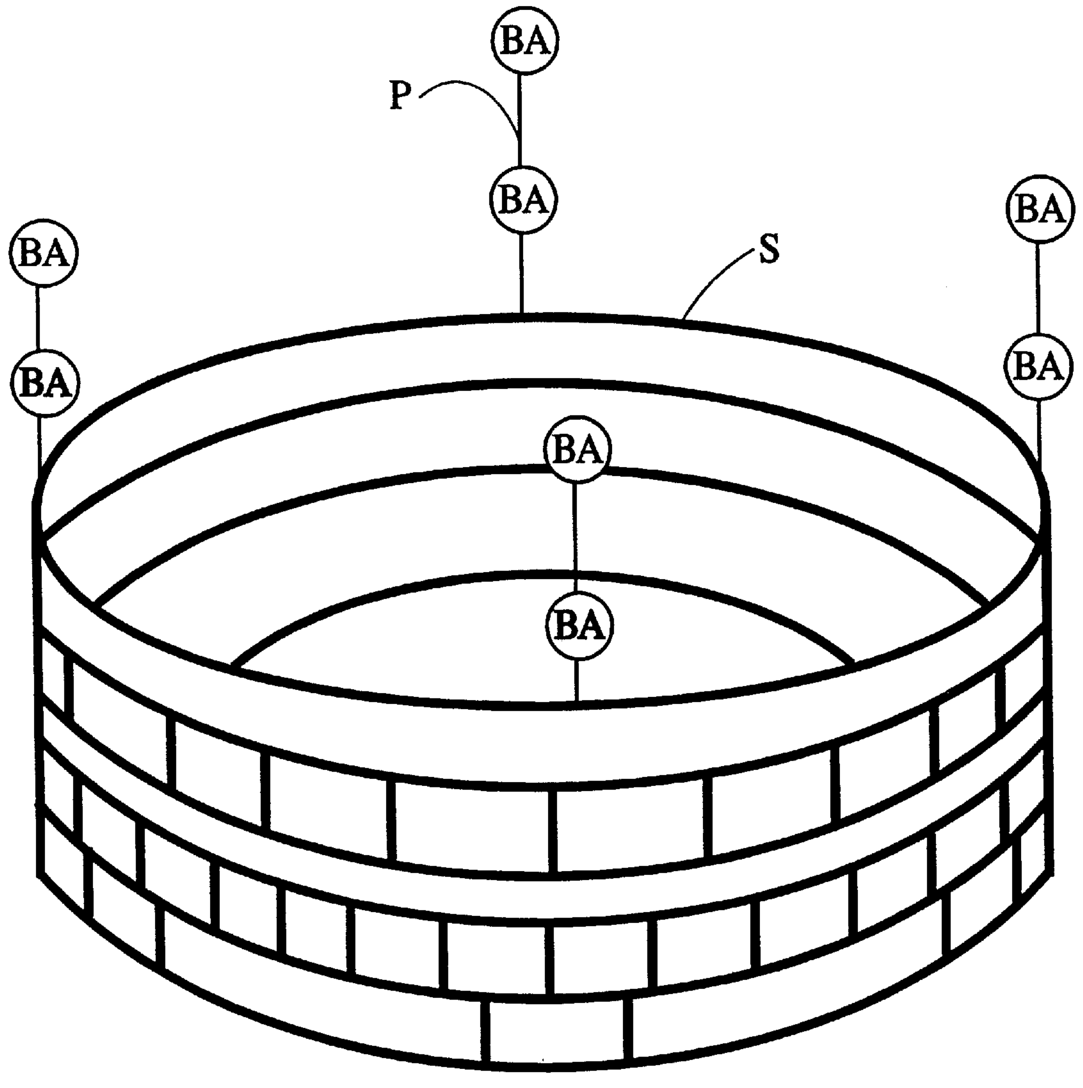
FIG. 21 depicts the use of arrays stationarily positioned about an amphitheater.

FIG. 21: Use of Ball Arrays stationarily positioned about an amphitheatre.

In certain preferred embodiment applications, an amphitheatre or open stadium S requires very dense cellular user support either inside, outside or both inside and outside said structure. Positioning Ball Antenna Arrays at a height above the building or buildings provides the ability to significantly increase cellular density. In certain preferred embodiments, more than one Ball Antenna Arrays may be positioned successively upon poles P.

Figure 22:
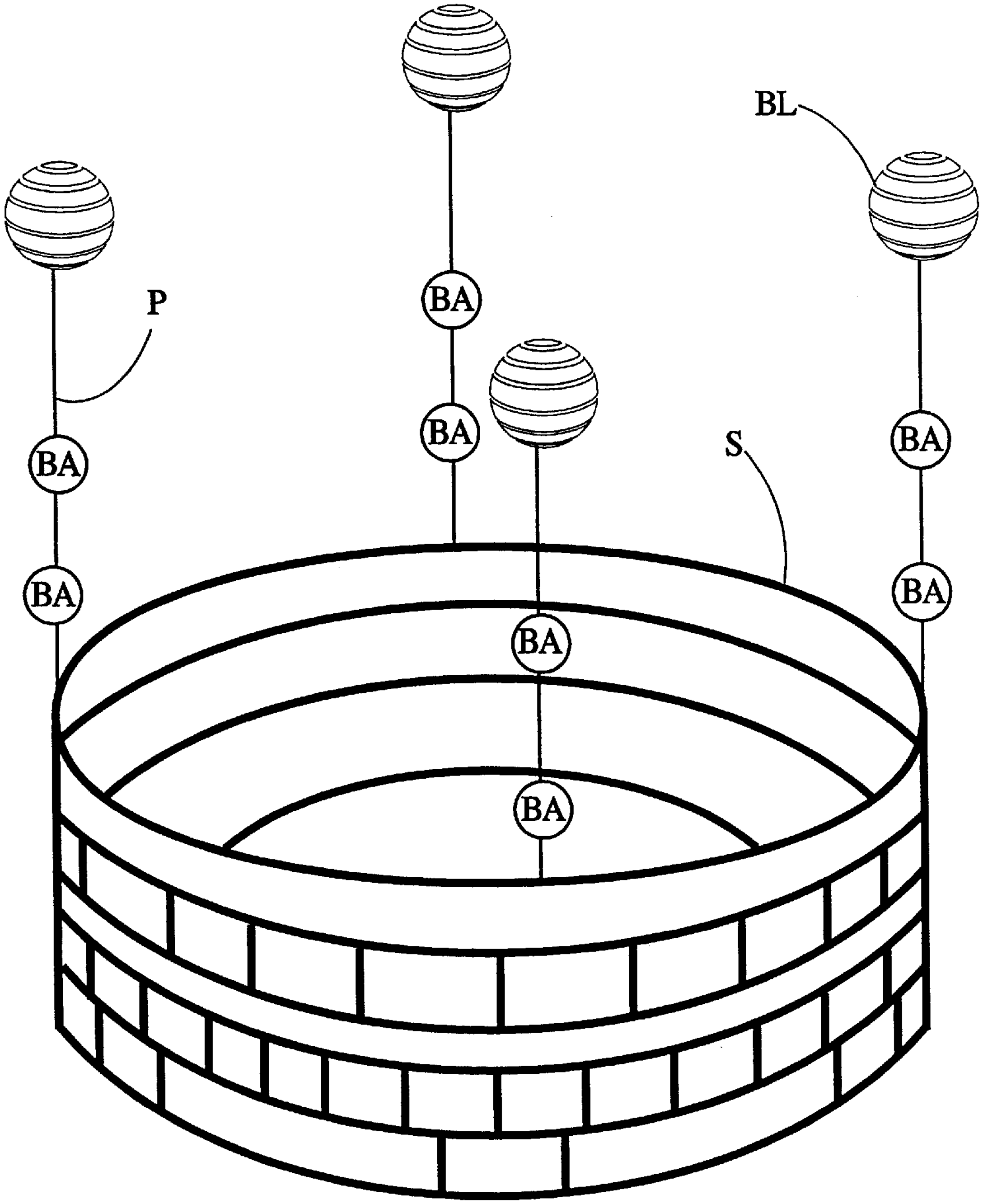
FIG. 22 depicts the use of arrays suspended from flotation devices such as balloons and anchored to earth.

FIG. 22: Use of Ball Arrays suspended from flotation devices and anchored to earth.

In certain preferred embodiment applications, including but not limited to open stadiums S, open air entertainment events, and the like, a temporary requirement for dense user support may exist. In such cases, assuming a climate which can support it, one or more instances of Ball Antenna Arrays may be strung on flexible poles P and suspended from balloons or other flotation devices BL.

Note that in some preferred embodiments, the poles P may be rope-like, such as being composed of airplane cable for instance.

In some preferred embodiments, position sensing circuitry may be incorporated to accurately locate the Ball Antenna Arrays to aid in calculating user location information. Note that such position sensing equipment may be incorporated as a prefered embodiment into any of the previously disclosed preferred embodiments.

Figure 23:
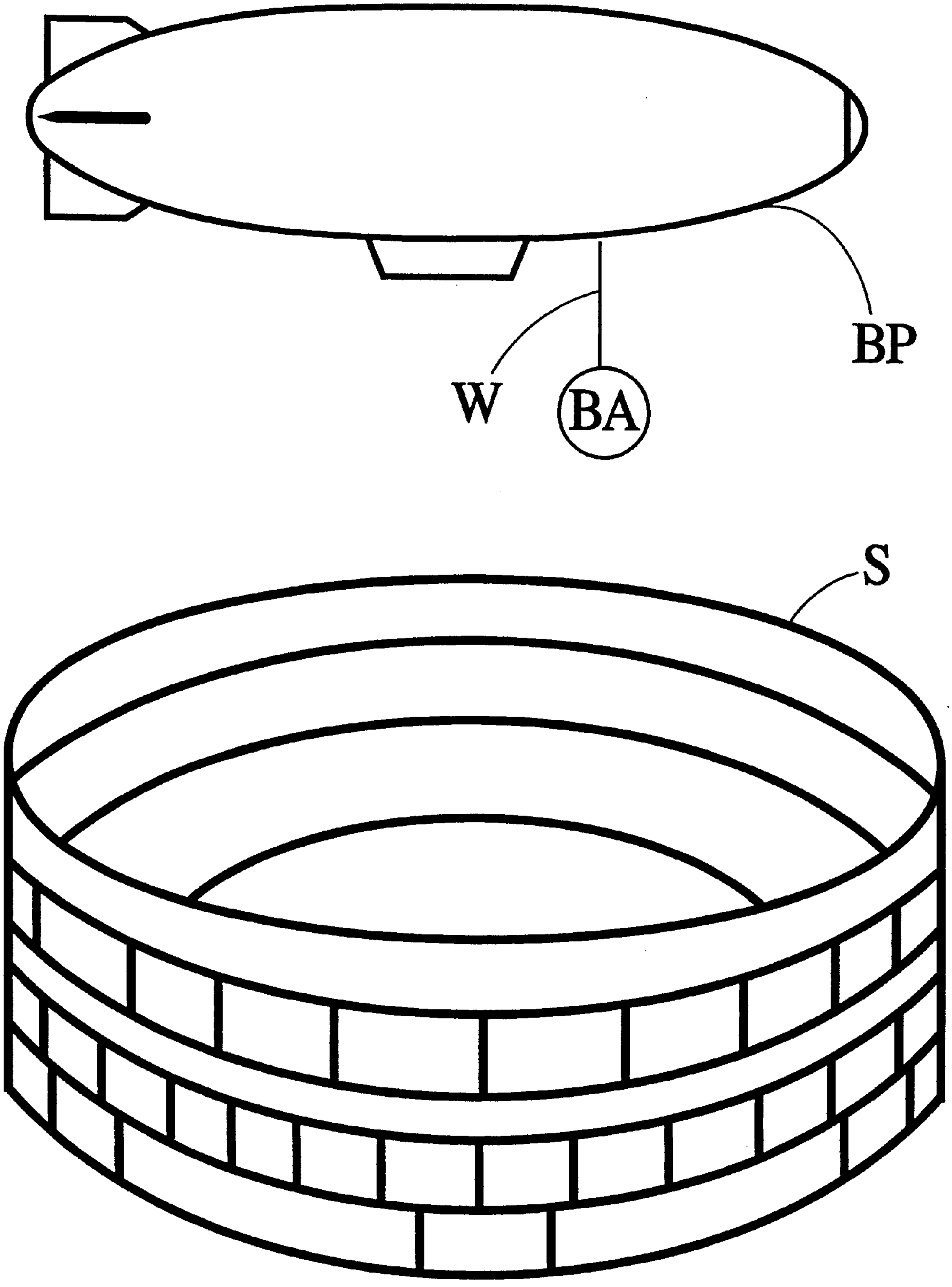
FIG. 23 depicts the use of arrays carried by airborne device such as a blimp or Unmanned Airborne Vehicle.

FIG. 23: Use of Ball Arrays carried by airborne device such as a blimp or Unmanned Airborne Vehicle.

FIG. 23 disclosed a referred embodiment wherein a blimp incorporates one or more Ball Antenna Arrays. In this FIG., the blimp can be seen to be providing support for a cellular user population in the neighborhood of a stadium.

The mechanism by which one or more Ball Antenna Arrays are carried and supported aloft in preferred embodiments includes but is not limited to lighter than aircraft, both manned and unmanned heavier than aircraft.

Note that other preferred embodiments include but are not limited to Ball Antenna Arrays being embedded in the flight surfaces of the airborne vehicle.

I claim:

1. A communications device comprised of a. two or more directional antennae whereby
   i. each antenna has a defined base location vector, an orientation direction vector, an attenuation function, and interface circuitry,
   ii. each antenna orientation direction vector lines in the major axis of the contour map of said antenna's said attenuation function,
   iii. said antenna base location vectors are proximate to said boundary of a convex shape in two or more dimensions,
   iv. for each said antenna, there exists at least one other antenna whereby the main attenuation lobes overlap,
   v. each said antenna interface circuit generates one or more quantities over time intervals based upon the physical state of the antenna, b. the antenna collection possesses a shared center wherein
   i. the base location vector is a distance from said antenna collection center which is a small fraction of the distance travel by a signal propagating in the communications medium within the time step of antenna interface sampling circuitry,
   ii. associated with the antenna collection center is an angular measure for one or more dimensions so that the user transmission/reception domain can be mapped in, c. one or more information processors whereby
   i. said antenna generated quantities are received by said information processors,
   ii. said received antenna generated quantities are related by linear combination of user area transmission strengths,
   iii. said user area transmission strengths at a given time step at a each discrete time-propagation-displacement step and each discrete angular-dimensional displacement step can be reasonably approximated by a linear combination of antenna generated quantities received by said information processor at said given time step and a finite number of time steps thereafter.

2. A device as in claim 1 wherein said convex shape is 2-dimensional.

3. A device as in claim 1 wherein said convex shape is 3-dimensional.

4. A device as in claim 2 wherein the shape is proximately a circle.

5. A device as in claim 3 wherein the shape is proximately a whole or partial sphere.

6. A device as in claim 3 wherein the shape is proximately a whole or partial ellipsoid.

7. A device as in claim 3 wherein the shape is proximately a whole or partial cylinder with convex ends.

8. A device as in claim 1 wherein all said antenna orientation vectors possess the same sign dot product with respect to the normal of the convex shape local to the base location vectors.

9. A device as in claim 8 wherein each said antenna orientation vector is normal to said proximate convex shape local to said antenna's base location vector.

10. A device as in claim 1 wherein the polarization of each antenna is effectively identical.

11. A device as in claim 1 wherein the said user area transmission strengths are evaluated at non-uniform discrete steps in at least one dimension.

12. A device as in claim 1 wherein each said directional antenna possesses a reflective surface.

13. A device as in claim 12 wherein all said directional antenna reflective surfaces collectively form a single connected surface when in operation.

14. A device as in claim 13 wherein said single connected surface during operation is comprised of two or more surfaces which when assembled provide the operational surface.

15. A device as in claims 1 to 14 further including an encapsulating shell of material wherein said shell material is approximately transparent to the electromagnetic signals being received by said antennae.

16. A device as in claims 1 to 14 further including one or more additional receiving antennas and circuitry whereby a collection of one or more signals fed from the additional antennas can be demodulated and amplified for reception.

17. A device as in claim 1 to 14 further including one or more transmitting antennas and circuitry whereby a collection of one or more signals can be modulated and amplified for transmission by said additional transmitting antennas.

18. A device as in claims 1 to 14 further including one or more additional receiving antennas and circuitry whereby a collection of one or more signals fed from the additional antennas can be demodulated and amplified for reception and one or more transmitting antennas and circuitry whereby a collection of one or more signals can be modulated and amplified for transmission by said additional transmitting antennas and further including, a. additional circuitry connecting the transmitting and receiving circuitry to one or more telephone or telecommunications network systems further including b. additional circuitry for controlling the communication processes of this device.

19. A device as in claim 18 performing the functions of a cellular base station.

20. A device as in claim 18 wherein said device functions as a base station in a system having a plurality of collectors for receiving and combining transmissions from each of one or more users.

21. A communications device for use with users transmitting in a communication medium with user transmissions characterized by time-propagation displacement and location displacement as a function of a user location relative to a communications device location, the communications device comprising, an antenna collection including two or more directional antennae where each antenna is defined by a base location vector, an attenuation function having a contour map and an antenna orientation direction vector lying in the contour map and where each antenna connects to an antenna interface circuit having time steps which generates quantities over time intervals based upon received user transmissions and wherein the contour map for one of the directional antennae overlaps the contour map of another one of the directional antennae whereby the received user transmission at said two or more antennae are linearly related, said antenna collection having said two or more directional antennae with base location vectors proximate to a common boundary of a shape in two or more dimensions, said antenna collection having a collection center wherein the base location vector for each of said antenna is a distance from said collection center which is small compared with the distance traveled by user transmissions propagating in the communications medium within the time step of the antenna interface sampling circuitry and wherein the antenna orientation direction vector for each of said antenna has a location measure in one or more dimensions relative to the antenna collection center, one or more information processors receiving the antenna generated quantities for each time step of the interface circuit for each of the antennae to provide discrete time-propagation displacements and discrete location displacements, and said information processors transforming a linear combination of said discrete time-propagation displacements and said discrete location displacements to form transformed combinations providing user location information.

* * * * *